US012739857B2

(12) United States Patent
Lee et al.

(10) Patent No.: US 12,739,857 B2
(45) Date of Patent: Sep. 15, 2026

(54) METHOD FOR TRANSMITTING AND RECEIVING DOWNLINK CONTROL CHANNEL AND APPARATUS THEREFOR

(71) Applicant: LG Electronics Inc., Seoul (KR)

(72) Inventors: Sunghoon Lee, Seoul (KR); Youngdae Lee, Seoul (KR); Jaehyung Kim, Seoul (KR); Suckchel Yang, Seoul (KR); Seonwook Kim, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 18/681,752

(22) PCT Filed: Aug. 1, 2022

(86) PCT No.: PCT/KR2022/011290
§ 371 (c)(1),
(2) Date: Feb. 6, 2024

(87) PCT Pub. No.: WO2023/014015
PCT Pub. Date: Feb. 9, 2023

(65) Prior Publication Data

US 2024/0349299 A1 Oct. 17, 2024

(30) Foreign Application Priority Data

Aug. 6, 2021 (KR) ........................ 10-2021-0103859
Nov. 5, 2021 (KR) ........................ 10-2021-0151294

(51) Int. Cl.
*H04W 72/232* (2023.01)
*H04L 5/00* (2006.01)
*H04W 76/28* (2018.01)

(52) U.S. Cl.
CPC ......... *H04W 72/232* (2023.01); *H04L 5/0055* (2013.01); *H04W 76/28* (2018.02)

(58) Field of Classification Search
CPC .... H04W 72/232; H04W 76/28; H04L 5/0055
See application file for complete search history.

(56) References Cited

U.S. PATENT DOCUMENTS

2020/0351892 A1* 11/2020 Yi ......................... H04W 72/53
2021/0051698 A1 2/2021 Tsai et al.
2024/0267193 A1* 8/2024 Yuan .................. H04W 72/232

FOREIGN PATENT DOCUMENTS

CA 3153178 A1 * 4/2021 ............ H04W 72/23
CN 114830779 A * 7/2022 ............ H04W 72/23
(Continued)

OTHER PUBLICATIONS

CMCC, "Discussion on PDCCH monitoring reduction during DRX active time," 3GPP TSG RAN WG1 #104-e, R1-2101054, e-Meeting, Jan. 25-Feb. 5, 2021, 3 pages.
(Continued)

*Primary Examiner* — Saad A. Waqas
(74) *Attorney, Agent, or Firm* — Fish & Richardson P.C.

(57) ABSTRACT

The present disclosure discloses a method by which a terminal receives a physical downlink control channel (PDCCH) in a wireless communication system. In particular, the method comprises: receiving a first parameter related to PDCCH monitoring adaptation; receiving a second parameter related to at least one threshold value associated with an offset indicating an interval between a downlink (DL) transmission and an uplink (UL) transmission related to the DL transmission; receiving downlink control information (DCI) including (i) first information related to the PDCCH monitoring adaptation based on the first parameter and (ii) second information for notifying the offset; and receiving, on the basis of the first information, the PDCCH on the basis of the PDCCH monitoring adaptation from a specific time, wherein the specific time may be determined (Continued)

on the basis that the offset has been compared with the at least one threshold value.

11 Claims, 17 Drawing Sheets

(56) References Cited

FOREIGN PATENT DOCUMENTS

| | | | | | |
|---|---|---|---|---|---|
| KR | 20240027013 A | * | 2/2024 | ........... | H04L 1/1887 |
| WO | 2021/211973 A1 | | 10/2021 | | |

OTHER PUBLICATIONS

CMCC, "Discussion on PDCCH monitoring reduction during DRX active time," 3GPP TSG RAN WG1 #105-e, R1-2104624, e-Meeting, May 10-27, 2021, 5 pages.
Fraunhofer HHI, Fraunhofer IIS, "DCI-based Power Saving Enhancements," 3GPP TSG RAN WG1 Meeting #104-e, R1-2101285, e-Meeting, Oct. 26-Nov. 13, 2020, 4 pages.
Fraunhofer HHI, Fraunhofer IIS, "DCI-based Power Saving Enhancements," 3GPP TSG RAN WG1 Meeting #105e, R1-2105263, e-Meeting, May 19-27, 2021, 6 pages.
International Search Report and Written Opinion in Appln. No. PCT/KR2022/011290, mailed on Nov. 16, 2022, 11 pages (with English translation).
Extended European Search Report in European Appln. No. 22853392.3, mailed on Jul. 8, 2025, 13 pages.
Huawei, HiSilicon, "Extension(s) to Rel-16 DCI-based power saving adaptation for an active BWP," R1-2104253, 3GPP TSG RAN WGI Meeting #105-e, E-meeting, May 10-27, 2021, 6 pages.
Moderator (vivo), "FL summary#2 of power saving for Active Time," R1-2101894, 3GPP TSG RAN WG1 Meeting #104-e, e-Meeting, Jan. 25-Feb. 5, 2021, 52 pages.
Office Action in Korean Appln. No. 10-2024-7003059, mailed on Mar. 24, 2026, 12 pages (with English translation).
Samsung, "Discussion on DCI-based power saving techniques," R1-2101220, 3GPP TSG RAN WG1 #104, e-Meeting, Jan. 25-Feb. 5, 2020, 8 pages.

* cited by examiner (a) Uplink Tx procedure based on dynamic grant (b) Uplink Tx procedure based on configured grant

FIG. 13

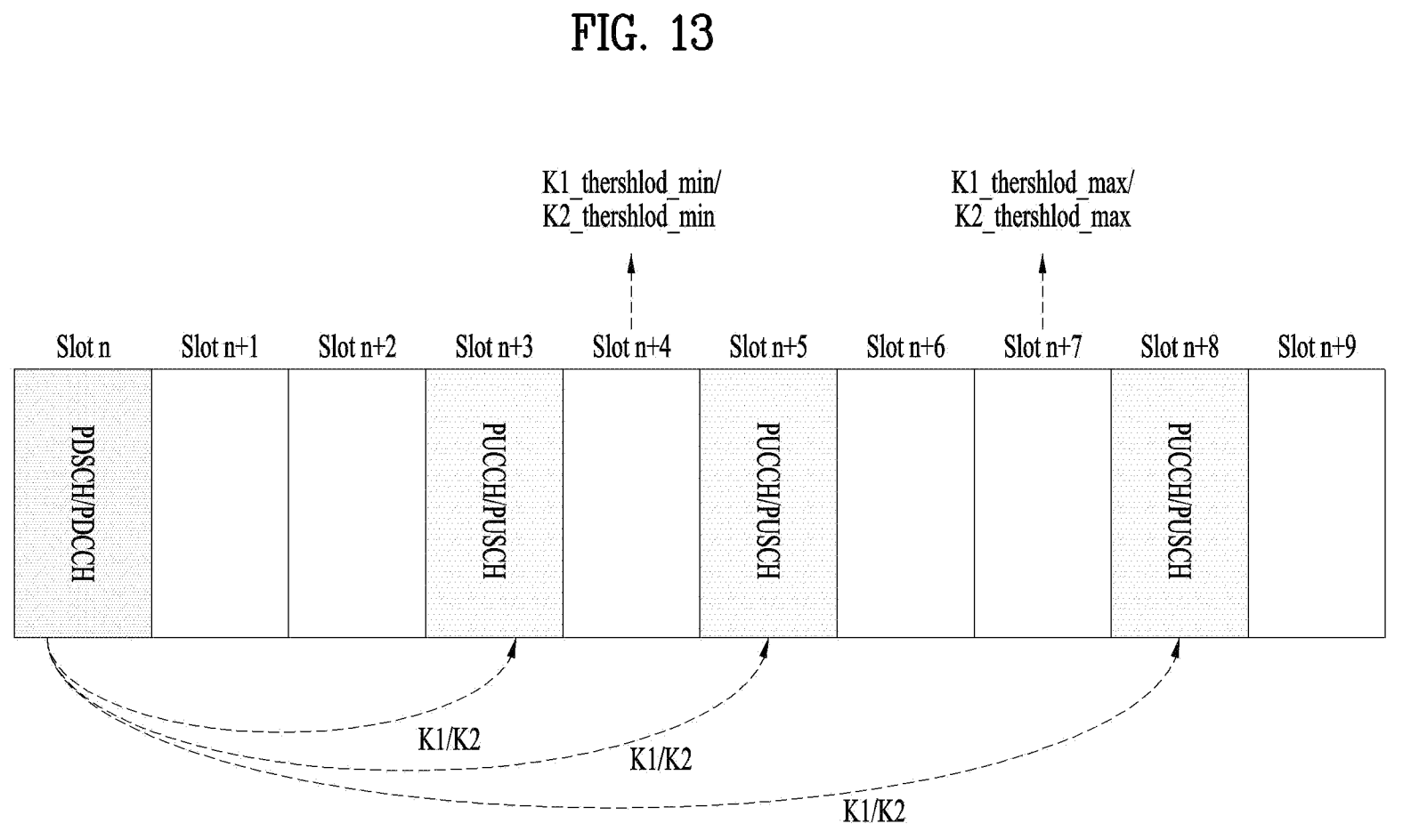

Slot n
PDSCH/PDCCH
Slot n+1
Slot n+2
Slot n+3
PUCCH/PUSCH
Slot n+4
Slot n+5
PUCCH/PUSCH
Slot n+6
Slot n+7
Slot n+8
PUCCH/PUSCH
Slot n+9
K1/K2
K1/K2
K1/K2
K1_thershlod_min/
K2_thershlod_min
K1_thershlod_max/
K2_thershlod_max

METHOD FOR TRANSMITTING AND RECEIVING DOWNLINK CONTROL CHANNEL AND APPARATUS THEREFOR

CROSS-REFERENCE TO RELATED APPLICATIONS

This application is a National Stage application under 35 U.S.C. § 371 of International Application No. PCT/KR2022/011290, filed on Aug. 1, 2022, which claims the benefit of Korean Application Nos. 10-2021-0151294, filed on Nov. 5, 2021, and 10-2021-0103859, filed on Aug. 6, 2021. The disclosures of the prior applications are incorporated by reference in their entirety.

TECHNICAL FIELD

The present disclosure relates to a method for transmitting and receiving a downlink control channel and apparatus therefor and, more particularly, to a method for determining a timing point of applying a PDCCH monitoring adaptation when the PDCCH monitoring adaptation is indicated by a Downlink Control Information (DCI) and apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

An object of the present disclosure is to provide a method of transmitting and receiving a downlink control channel and an apparatus therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In one technical aspect of the present disclosure, provided is a method of receiving a Physical Downlink Control Channel (PDCCH) by a user equipment in a wireless communication system, the method including receiving a first parameter related to a PDCCH monitoring adaptation, receiving a second parameter related to at least one threshold related with an offset indicating an interval between a Downlink (DL) transmission and an Uplink (UL) transmission related to the DL transmission, receiving a Downlink Control Information (DCI) including (i) a first information related to a PDCCH monitoring adaptation based on the first parameter and (ii) a second information for indicating the offset, and receiving the PDCCH based on the PDCCH monitoring adaptation from a specific time based on the first information, wherein the specific time may be determined based on comparing the offset and the at least one threshold.

The at least one threshold may include a maximum threshold and a minimum threshold related with the offset.

The DCI may be for scheduling a Physical Downlink Shared Channel (PDSCH) and the offset may indicate an interval between the PDSCH and a Hybrid Automatic Repeat Request-Acknowledgment (HARQ-ACK) related to the PDSCH.

The DCI may be for scheduling a Physical Uplink Shared Channel (PUSCH) and the offset may indicate an interval between the DCI and the PUSCH.

Based on the offset smaller than the at least one threshold, the specific time may be a time related to the at least one threshold.

Based on the offset exceeding the at least one threshold, the specific time may be s a time related to the at least one threshold.

In another technical aspect of the present disclosure, provided is a user equipment receiving a Physical Downlink Control Channel (PDCCH) in a wireless communication system, the user equipment including at least one transceiver, at least one processor, and at least one memory connected operably to the at least one processor and configured to store instructions for enabling the at least one processor to perform an operation when executed, wherein the operation may include receiving a first parameter related to a PDCCH monitoring adaptation through the at least one transceiver, receiving a second parameter related to at least one threshold related with an offset indicating an interval between a Downlink (DL) transmission and an Uplink (UL) transmission related to the DL transmission through the at least one transceiver, receiving a Downlink Control Information (DCI) including (i) a first information related to a PDCCH monitoring adaptation based on the first parameter and (ii) a second information for indicating the offset through the at least one transceiver, and receiving the PDCCH based on the PDCCH monitoring adaptation from a specific time based on the first information through the at least one transceiver and wherein the specific time may be determined based on comparing the offset and the at least one threshold.

The at least one threshold may include a maximum threshold and a minimum threshold related with the offset.

The DCI may be for scheduling a Physical Downlink Shared Channel (PDSCH) and the offset may indicate an interval between the PDSCH and a Hybrid Automatic Repeat Request-Acknowledgment (HARQ-ACK) related to the PDSCH.

The DCI may be for scheduling a Physical Uplink Shared Channel (PUSCH) and the offset may indicates an interval between the DCI and the PUSCH.

Based on the offset smaller than the at least one threshold, the specific time may be a time related to the at least one threshold.

Based on the offset exceeding the at least one threshold, the specific time may be a time related to the at least one threshold.

In another technical aspect of the present disclosure, provided is an apparatus for receiving a Physical Downlink Control Channel (PDCCH) in a wireless communication system, the apparatus including at least one processor and at least one memory connected operably to the at least one processor and configured to store instructions for enabling the at least one processor to perform an operation when executed, wherein the operation may include receiving a first parameter related to a PDCCH monitoring adaptation, receiving a second parameter related to at least one threshold related with an offset indicating an interval between a Downlink (DL) transmission and an Uplink (UL) transmission related to the DL transmission, receiving a Downlink Control Information (DCI) including (i) a first information related to a PDCCH monitoring adaptation based on the first parameter and (ii) a second information for indicating the offset, and receiving the PDCCH based on the PDCCH monitoring adaptation from a specific time based on the first information and wherein the specific time may be determined based on comparing the offset and the at least one threshold.

In another technical aspect of the present disclosure, provided is a computer-readable storage medium comprising at least one computer program configured to enable at least one processor to perform an operation, wherein the operation may include receiving a first parameter related to a PDCCH monitoring adaptation, receiving a second parameter related to at least one threshold related with an offset indicating an interval between a Downlink (DL) transmission and an Uplink (UL) transmission related to the DL transmission, receiving a Downlink Control Information (DCI) including (i) a first information related to a PDCCH monitoring adaptation based on the first parameter and (ii) a second information for indicating the offset, and receiving the PDCCH based on the PDCCH monitoring adaptation from a specific time based on the first information and wherein the specific time may be determined based on comparing the offset and the at least one threshold.

In another technical aspect of the present disclosure, provided is a method of transmitting a Physical Downlink Control Channel (PDCCH) by a base station in a wireless communication system, the method including transmitting a first parameter related to a PDCCH monitoring adaptation, transmitting a second parameter related to at least one threshold related with an offset indicating an interval between a Downlink (DL) transmission and an Uplink (UL) transmission related to the DL transmission, transmitting a Downlink Control Information (DCI) including (i) a first information related to a PDCCH monitoring adaptation based on the first parameter and (ii) a second information for indicating the offset, and transmitting the PDCCH based on the PDCCH monitoring adaptation from a specific time based on the first information, wherein the specific time may be determined based on comparing the offset and the at least one threshold.

In further technical aspect of the present disclosure, provided is a base station transmitting a Physical Downlink Control Channel (PDCCH) in a wireless communication system, the base station including at least one transceiver, at least one processor, and at least one memory connected operably to the at least one processor and configured to store instructions for enabling the at least one processor to perform an operation when executed, wherein the operation may include transmitting a first parameter related to a PDCCH monitoring adaptation through the at least one transceiver, transmitting a second parameter related to at least one threshold related with an offset indicating an interval between a Downlink (DL) transmission and an Uplink (UL) transmission related to the DL transmission through the at least one transceiver, transmitting a Downlink Control Information (DCI) including (i) a first information related to a PDCCH monitoring adaptation based on the first parameter and (ii) a second information for indicating the offset through the at least one transceiver, and transmitting the PDCCH based on the PDCCH monitoring adaptation from a specific time based on the first information through the at least one transceiver and wherein the specific time may be determined based on comparing the offset and the at least one threshold.

According to the present disclosure, it is possible to minimize a problem that may occur by applying a suitable application delay according to DCI received by a UE when a PDCCH monitoring adaptation is indicated to the UE.

An application timing point of a PDCCH monitoring adaptation proposed in the present disclosure may be configured in a UE independently or in association through various methods.

Through this, the UE may perform a PDCCH monitoring adaptation indication within a DRX active time without any problem.

It is to be understood that both the foregoing general description and the following detailed description of the present disclosure are exemplary and explanatory and are intended to provide further explanation of the disclosure as claimed.

BRIEF DESCRIPTION OF DRAWINGS

FIG. 12 and FIG. 13 are diagrams for describing an example of an application delay according to an embodiment of the present disclosure.

DETAILED DESCRIPTION

Figure 1:
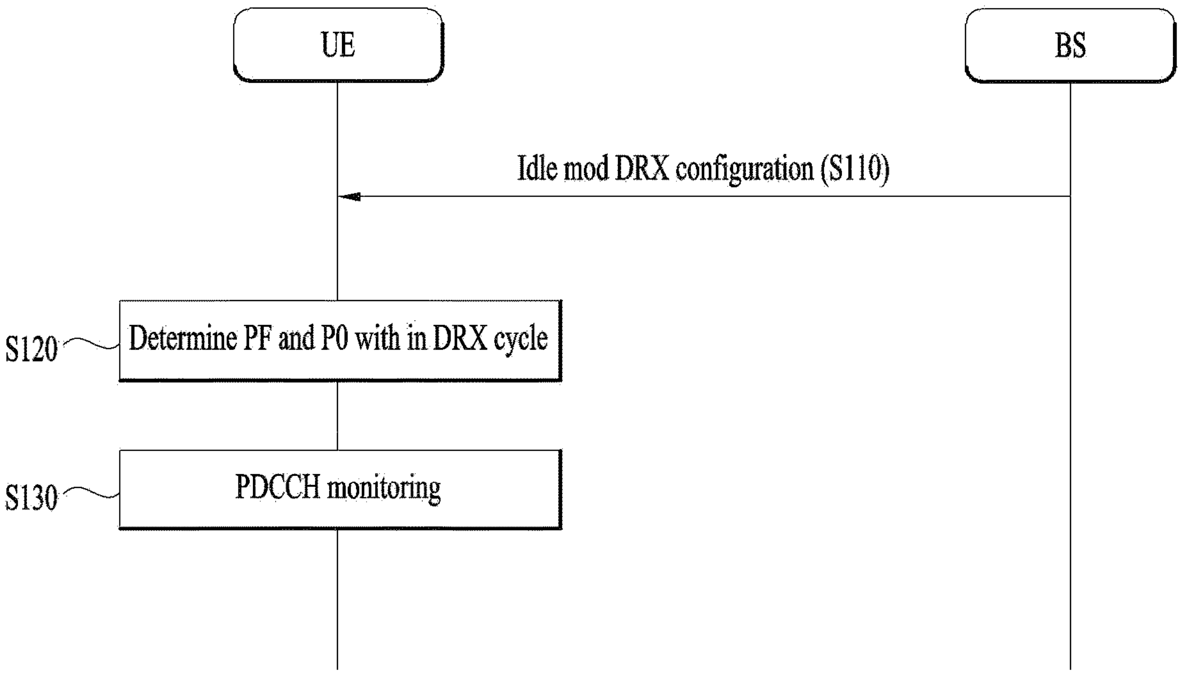
FIGS. 1 and 2 are diagrams for explaining idle mode discontinuous reception (DRX) operation.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE).

OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DRX (Discontinuous Reception) Operation

The UE uses Discontinuous Reception (DRX) in RRC_IDLE and RRC_INACTIVE state in order to reduce power consumption. When the DRX is configured, the UE performs a DRX operation according to DRX configuration information.

When the UE operates based on the DRX, the UE repeats ON/OFF for reception. For example, when the DRX is configured, the UE attempts to receive/detect the PDCCH (e.g., PDCCH monitoring) only in a predetermined time interval (e.g., ON), and does not attempt to receive the PDCCH in the remaining time period (e.g., OFF/sleep).

At this time, a time period during which the UE should attempt to receive the PDCCH is referred to as an On-duration, and this on-duration is defined once per DRX cycle. The UE can receive DRX configuration information from a gNB through a RRC signaling and operate as the DRX through a reception of the (Long) DRX command MAC CE.

The DRX configuration information may be included in the MAC-CellGroupConfig. The IE MAC-CellGroupConfig is used to configure MAC parameters for a cell group, including DRX.

DRX (Discontinuous Reception) means an operation mode for enabling a UE (User Equipment) to reduce battery consumption so that the UE can receive/monitor a downlink channel discontiguously. That is, a UE configured with DRX can reduce power consumption by receiving a DL signal discontiguously. The DRX operation is performed in a DRX cycle indicative of a time interval in which On Duration is periodically repeated. The DRX cycle includes On Duration and sleep duration (or Opportunity for DRX). The On Duration indicates a time interval in which a UE monitors a PDCCH in order to receive the PDCCH. DRX may be performed in an RRC (Radio Resource Control)_IDLE state (or mode), an RRC_INACTIVE state (or mode), or an RRC_CONNECTED state (or mode). In the RRC_IDLE state and the RRC_INACTIVE state, DRX is used to receive a paging signal discontiguously.

RRC_Idle state: state in which a radio connection (RRC connection) is not established between a base station and a UE.

RRC Inactive state: state in which a radio connection (RRC connection) has been established between a base station and a UE, but a radio connection is inactivated.

RRC_Connected state: state in which a radio connection (RRC connection) has been established between a base station and a UE.

DRX is basically divided into Idle mode DRX, Connected DRX (C-DRX) and extended DRX. DRX applied in the RRC IDLE state is called Idle mode DRX, and DRX applied in the RRC CONNECTED state is called Connected mode DRX (C-DRX).

eDRX (Extended/enhanced DRX) is a mechanism capable of expanding the cycle of Idle mode DRX and C-DRX. In the Idle mode DRX, whether to permit eDRX may be configured based on system information (e.g., SIB1).

The SIB1 may include an eDRX-Allowed parameter. The eDRX-Allowed parameter is a parameter indicating whether Idle mode extended DRX is permitted.

(1) IDLE Mode DRX

In the IDLE mode, the UE may use DRX to reduce power consumption. One paging occasion (PO) may be a time interval (e.g., a slot or a subframe) in which a paging-radio network temporary identifier (P-RNTI) based physical downlink control channel (PDCCH) may be transmitted. The P-RNTI-based PDCCH may address/schedule a paging message. For P-RNTI-based PDCCH transmission, the PO may indicate a first subframe for PDCCH repetition.

One paging frame (PF) is one radio frame which may include one or a plurality of paging occasions. When DRX is used, a UE may be configured to monitor only one PO per DRX cycle. The PF, PO and/or PNB may be determined based on a DRX parameter provided via network signaling (e.g., system information).

Hereafter, 'PDCCH' may refer to MPDCCH, NPDCCH and/or normal PDCCH. Hereafter, 'UE' may refer to MTC UE, BL (Bandwidth reduced Low complexity)/CE (coverage enhanced) UE, NB-IoT UE, Reduced Capability (RedCap) UE, normal UE and/or IAB-MT(mobile termination).

FIG. 1 is a flowchart showing an example of a method of performing an Idle mode DRX operation.

A UE receives, from a base station, Idle mode DRX configuration information through a higher layer signaling (e.g., system information) (S110).

Furthermore, the UE determines a PF (Paging Frame) and a PO (Paging Occasion), for monitoring a physical downlink control channel (e.g., PDCCH) in a paging DRX cycle based on the Idle mode DRX configuration information (S120). In this case, the DRX cycle includes On Duration and sleep duration (or Opportunity for DRX).

Furthermore, the UE monitors a PDCCH in the PO of the determined PF (S130). The UE monitors only one time interval (PO) for each paging DRX cycle. For example, the time interval may be a slot or a subframe.

Additionally, if the UE receives a PDCCH (more exactly, CRC of PDCCH) scrambled by a P-RNTI during On duration (i.e., if paging is detected), the UE may transit to a connected mode and transmit or receive data with the base station.

Figure 2:
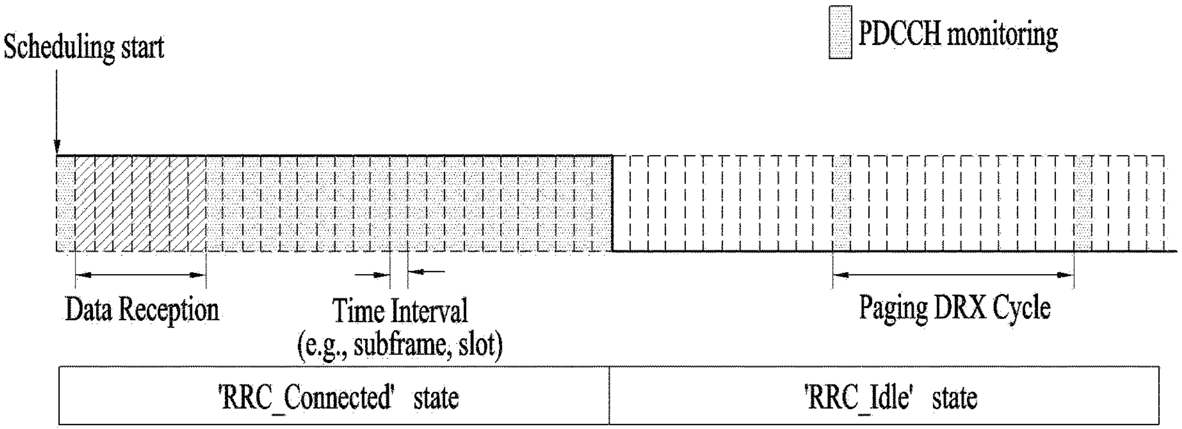

FIG. 2 is a diagram showing an example of an Idle mode DRX operation.

Referring to FIG. 2, if there is a traffic (data) toward a UE in the RRC_Idle state (hereinafter referred to as 'Idle state'), paging occurs toward the corresponding UE.

Thus, the UE wakes up every (paging) DRX cycle and monitors a PDCCH.

If Paging is present, the UE transits to a Connected state, and receives data. Otherwise, the UE may enter a sleep mode again.

(2) Connected Mode DRX (C-DRX)

C-DRX is DRX applied in the RRC Connected state. The DRX cycle of C-DRX may be configured with a Short DRX cycle and/or a Long DRX cycle. The Short DRX cycle is Optional.

If C-DRX is configured, a UE performs PDCCH monitoring for On Duration. If there is a PDCCH successfully detected during the PDCCH monitoring, the UE operates (or runs) an inactivity timer and maintains an awake state. In contrast, if there is no PDCCH successfully detected during the PDCCH monitoring, the UE enters to a sleep state after the On Duration is ended.

If C-DRX is configured, a PDCCH reception occasion (e.g., a slot having a PDCCH search space/candidate) may be configured discontiguously based on a C-DRX configuration. In contrast, if C-DRX is not configured, a PDCCH reception occasion (e.g., a slot having a PDCCH search space/candidate) may be configured contiguously in accordance with PDCCH search space configuration. Meanwhile, PDCCH monitoring may be limited in a time interval configured as a measurement gap, regardless of a C-DRX configuration.

Figure 3:
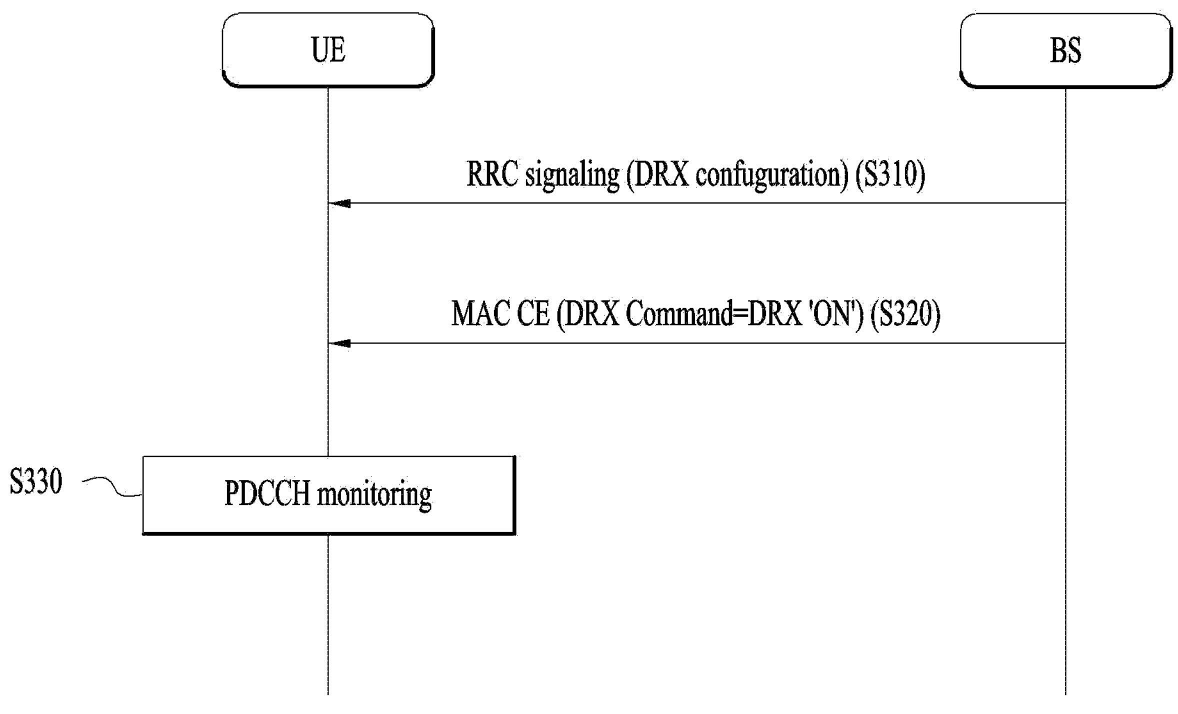
FIGS. 3 to 5 are diagrams for explaining DRX operation in a radio resource control (RRC) connected mode.

FIG. 3 is a flowchart showing an example of a method of performing a C-DRX operation.

A UE receives, from a base station, RRC signalling (e.g., MAC-MainConfig IE) including DRX configuration information (S310). The DRX configuration information may include the following information.

on-duration: the duration that the UE waits for, after waking up, to receive PDCCHs. If the UE successfully decodes a PDCCH, the UE stays awake and starts the drx-inactivity timer;

onDurationTimer: the duration in which the DRX cycle starts. For example, the duration may refer to a time interval to be continuously monitored at the beginning of a DRX cycle, which may be represented in units of milliseconds (ms).

drx-InactivityTimer: the duration after the PDCCH occasion in which a PDCCH indicates a new UL or DL transmission for the MAC entity. For example, the duration may be a time interval represented in units of ms after the UE decodes the PDCCH including scheduling information. That is, the duration refers to a duration in which the UE waits to successfully decode another PDCCH after decoding the PDCCH. If no other PDCCHs are detected within the corresponding duration, the UE transitions to the sleep mode.

The UE restarts the drx-inactivity timer after successfully decoding a PDCCH for initial transmission only except for a PDCCH for retransmission.

drx-RetransmissionTimer: for DL, the maximum duration until a DL retransmission is received; for UL the maximum duration until a grant for UL retransmission is received. For example, for UL, drx-RetransmissionTimer indicates the number of slots in a bandwidth part (BWP) where a transport block (TB) to be retransmitted is transmitted. For DL, drx-RetransmissionTimer indicates the number of slots in a BWP in which a TB to be retransmitted is received.

longDRX-Cycle: On Duration occurrence period drxStartOffset: a subframe number in which a DRX cycle is started drxShortCycleTimer: the duration the UE shall follow the Short DRX cycle;

shortDRX-Cycle: a DRX Cycle operating as much as a drxShortCycleTimer number when Drx-InactivityTimer is terminated drx-SlotOffset: the delay before drx-onDurationTimer starts. For example, the delay may be expressed in units of ms, and more particularly, in multiples of 1/32 ms.

Active time: total duration that the UE monitors PDCCH, which may include (a) the "on-duration" of the DRX cycle, (b) the time UE is performing continuous reception while the drx-inactivity timer has not expired, and (c) the time when the UE is performing continuous reception while waiting for a retransmission opportunity.

Specifically, when the DRX cycle is configured, an active time for a serving cell of a DRX group includes the following.

(a) drx-onDurationTimer or (b) drx-InactivityTimer configured for the DRX group is running; or (c) drx-RetransmissionTimerDL or drx-RetransmissionTimerUL is running on any Serving Cell in the DRX group; or (d) ra-ContentionResolutionTimer or msgB-ResponseWindow is running; or (e) a Scheduling Request is sent on PUCCH and is pending; or (f) a PDCCH indicating a new transmission addressed to the C-RNTI of the MAC entity has not been received after successful reception of a Random Access Response for the Random Access Preamble not selected by the MAC entity among the contention-based Random Access Preamble.

Furthermore, if DRX 'ON' is configured through the DRX command of a MAC CE (command element) (S320), the UE monitors a PDCCH for the ON duration of a DRX cycle based on the DRX configuration (S330).

Figure 4:
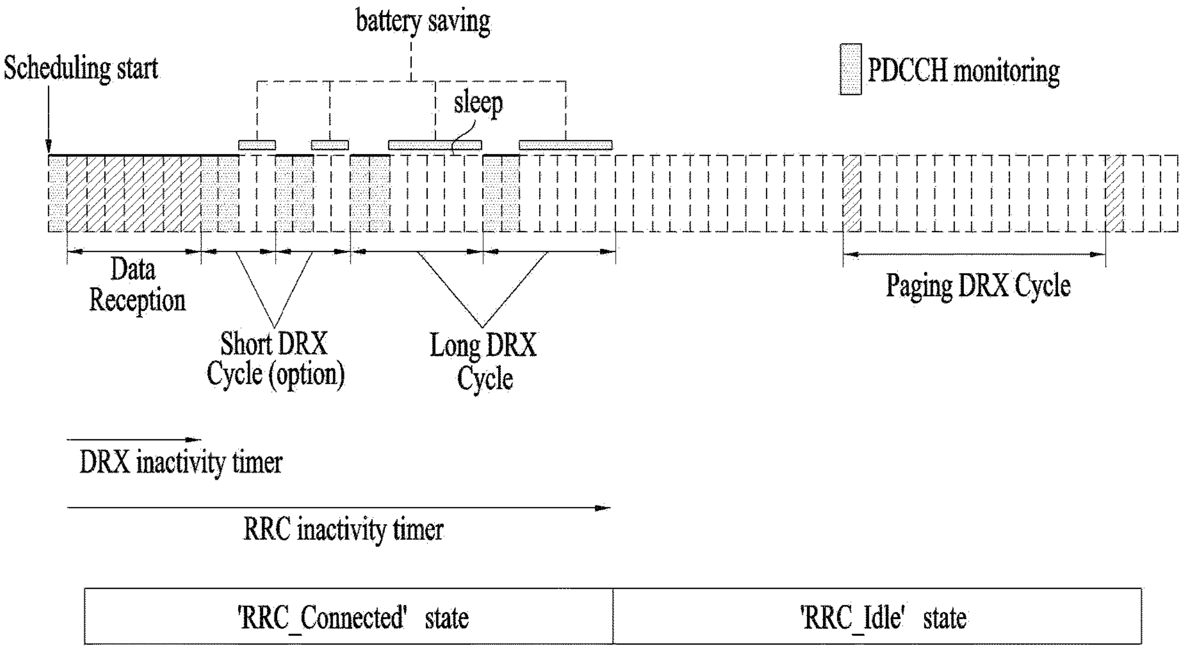

FIG. 4 is a diagram showing an example of a C-DRX operation.

Referring to FIG. 4 when the UE receives scheduling information (e.g., DL assignment or UL grant) in the RRC-_Connected state (hereinafter referred to as the connected state), the UE runs a DRX inactivity timer and an RRC inactivity timer.

After the DRX inactivity timer expires, a DRX mode starts. The UE wakes up in a DRX cycle and monitors a PDCCH during a predetermined time (on duration timer).

In this case, if Short DRX is configured, when the UE starts the DRX mode, the UE first starts in a short DRX cycle, and starts to a long DRX cycle after the short DRX cycle is terminated. The Long DRX cycle is a multiple of the short DRX cycle. In the short DRX cycle, the UE wakes up more frequently. After the RRC inactivity timer expires, the UE shifts to an Idle state and performs an Idle mode DRX operation.

Figure 5:
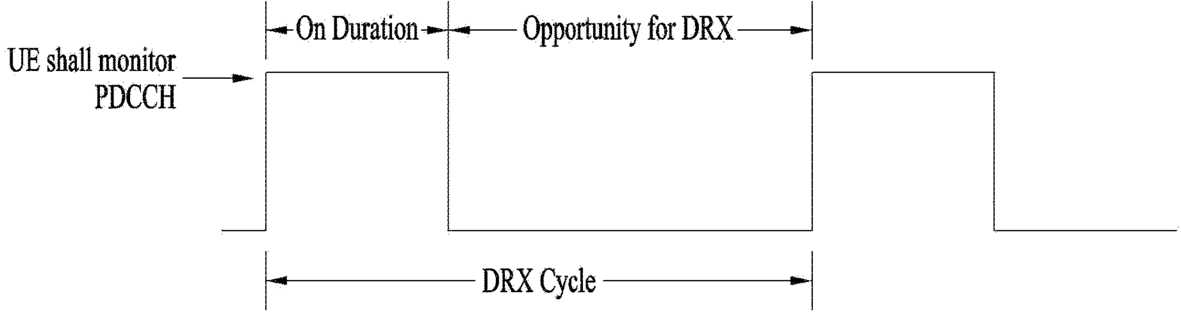

FIG. 5 illustrates a DRX cycle. The C-DRX operation has been introduced for power saving of the UE. If the UE receives no PDCCH within the on-duration defined for each DRX cycle, the UE enters the sleep mode until the next DRX cycle and does not perform transmission/reception.

On the other hand, when the UE receives a PDCCH within the on-duration, the active time may continue (or increase) based on the operations of an inactivity timer, a retransmission timer, etc. If the UE receives no additional data within the active time, the UE may operate in the sleep mode until the next DRX operation.

In NR, a wake-up signal (WUS) has been introduced to obtain additional power saving gain in addition to the existing C-DRX operation. The WUS may be to inform whether the UE needs to perform PDCCH monitoring within the on-duration of each DRX cycle (or a plurality of DRX cycles). If the UE detects no WUS on a specified or indicated WUS occasion, the UE may maintain the sleep mode without performing PDCCH monitoring in one or more DRX cycles associated with the corresponding WUS.

(3) WUS (DCI Format 2_6)

According to the power saving technology of Rel-16 NR systems, when the DRX operation is performed, it is possible to inform the UE whether the UE needs to wake up for each DRX cycle by DCI format 2_6.

Figure 6:
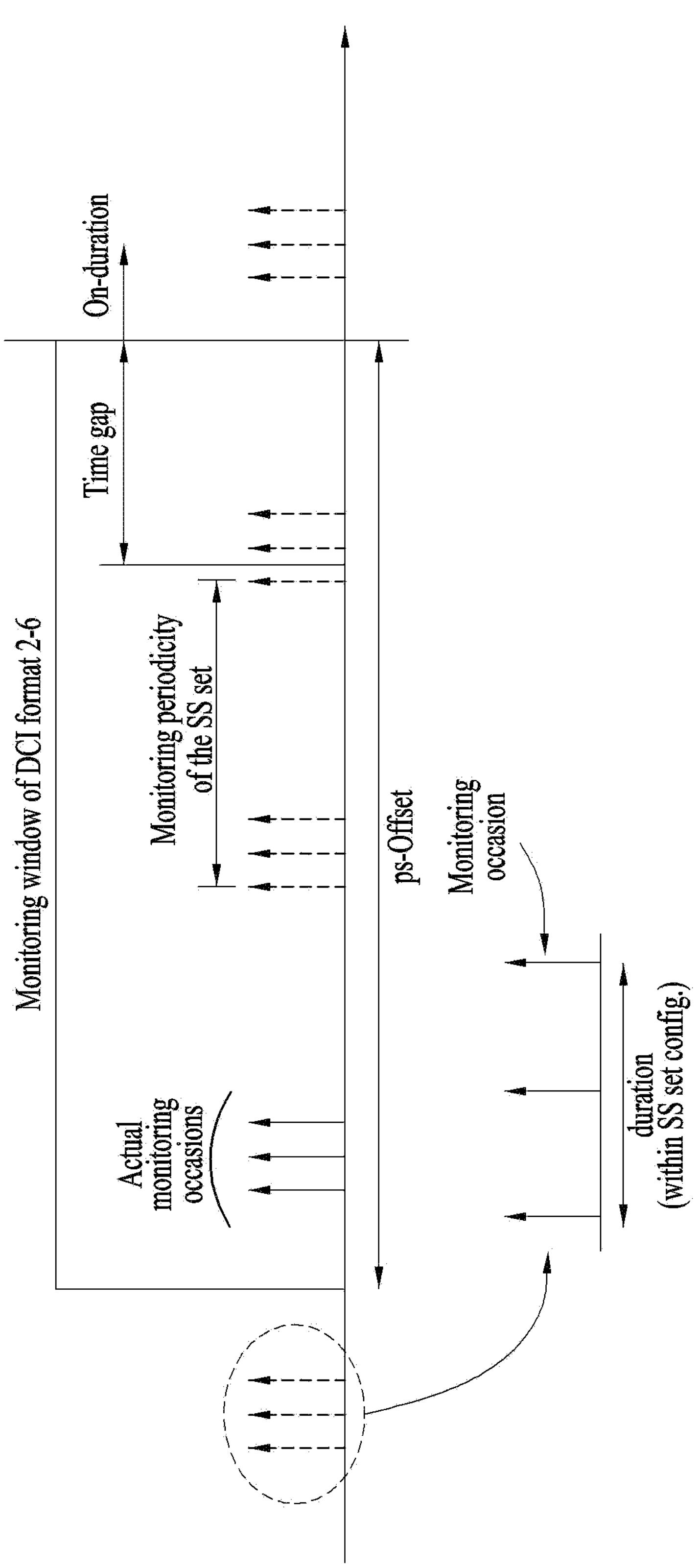
FIG. 6 is a diagram for explaining a method of monitoring DCI format 2_6.

Referring to FIG. 6, a PDCCH monitoring occasion for DCI format 2_6 may be determined by ps-Offset indicated by the network and a time gap reported by the UE. In this case, the time gap reported by the UE may be interpreted as a preparation period necessary for an operation after the UE wakes up.

Referring to FIG. 6, the base station (BS) may provide the UE with a search space (SS) set configuration capable of monitoring DCI format 2_6. According to the corresponding SS set configuration, DCI format 2_6 may be monitored in consecutive slots as long as the duration at the monitoring periodicity interval.

In the DRX configuration, a monitoring window for monitoring DCI format 2_6 may be determined by the start time of the DRX cycle (e.g., a point where the on-duration timer starts) and ps-Offset configured by the BS. In addition, PDCCH monitoring may not be required in the time gap reported by the UE. Consequently, an SS set monitoring occasion on which the UE actually performs monitoring may be determined as a first full duration (i.e., actual monitoring occasions of FIG. 6) within the monitoring window.

If the UE detects DCI format 2_6 in the monitoring window configured based on ps-Offset, the UE may be informed by the BS whether the UE wakes up in the next DRX cycle.

Search Space Set (SS Set) Group Switching

In the current NR standards, the SS set group switching has been defined to reduce the power consumption of the UE. According to the SS set group switching, the UE may be configured with a plurality of SS set groups, and an SS set group to be monitored by the UE among the plurality of SS set groups may be indicated. In addition, the UE may monitor an SS set included in the corresponding SS set group according to the corresponding indication and skip monitoring of SS sets not included in the corresponding SS set group.

For example, the UE may be provided with a list of SS set groups configured with a Type 3-PDCCH common search space (CSS) set and/or a user-specific search space (USS) set. In addition, if a list of SS set groups is provided, the UE may monitor SS sets corresponding to group index #0.

The UE may perform the SS set group switching operation depending on whether SearchSpaceSwitchTrigger is configured.

If SearchSpaceSwitchTrigger is configured for the UE, the UE may switch the SS set group according to the indication of DCI format 2_0.

For example, if the value of an SS Set Group Switching Flag field in DCI format 2_0 is 0, the UE may start monitoring SS set group #0 after a predetermined time from the time when the UE receives DCI format 2_0 and stop monitoring SS set group #1.

If the value of the SS Set Group Switching Flag field in DCI format 2_0 is 1, the UE may start monitoring SS set group #1 after a predetermined time from the time when the UE receives DCI format 2_0 and stop monitoring SS set group #0. If the UE starts monitoring SS set group #1, the UE may start counting a timer configured by SearchSpaceSwitchTimer. If the timer expires, the UE may start monitoring SS set group #0 after a predetermined time from the time when the timer expires and stop monitoring SS set group #1.

If SearchSpaceSwitchTrigger is not configured for the UE, the UE may change the SS set group based on DCI reception. For example, when the UE receives the DCI while monitoring SS set group #0 (or SS set group #1), the UE may start monitoring SS set group #1 (or SS set group #0) after a predetermined time from the time when the UE receives the DCI and stop monitoring SS set group #0 (or SS set group #1). In this case, the UE may start counting the timer configured by SearchSpaceSwitchTimer. If the timer expires, the UE may start monitoring SS set group #0 (or SS set group #1) after a predetermined time from the time when the timer expires and stop monitoring SS set group #1 (or SS set group #0).

On the other hand, as described above, the UE starts to monitor the SS Set Group #0 (or SS Set Group #1) after a predetermined time from the timing point of receiving the DCI Format_2_0. In this case, 'after a predetermined time' may mean that monitoring of the SS Set Group #0 (or SS Set Group #1) may start from a first slot (or applicable slot boundary) after at least $P_{switch}$ symbols since a last symbol of the PDCCH including the received DCI. This is because it may require a predetermined time for the UE to perform an actual SS Set Group Switching operation after confirming a SS Set Group Switching indication by decoding the DCI.

In this case, the $P_{switch}$ may be configured through RRC signaling. In addition, a minimum $P_{switch}$ value is defined as shown in [Table 1] below based on UE's capability and the smallest SCS(u) among Subcarrier Spacings (SCS) of all DL BWPs configured in the serving cell (or a set of serving cells).

TABLE 1

| u | Minimum $P_{switch}$ value for UE processing capability 1 [symbols] | Minimum $P_{switch}$ value for UE processing capability 2 [symbols] |
|---|---|---|
| 0 | 25 | 10 |
| 1 | 25 | 12 |
| 2 | 25 | 22 |

Figure 7:
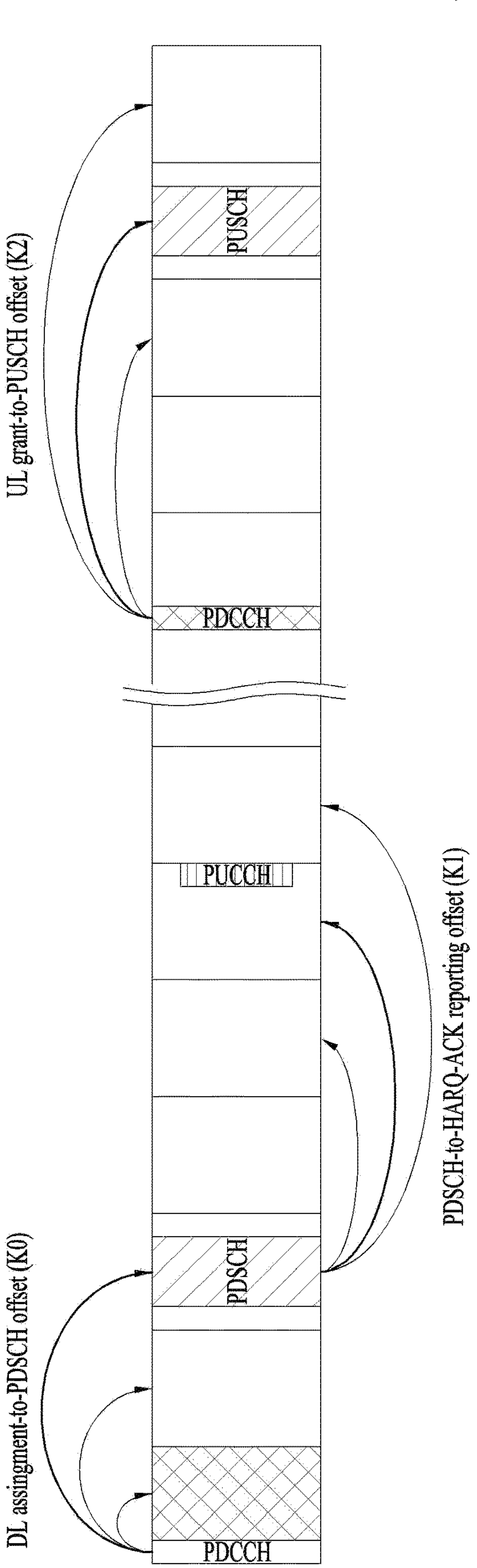
FIG. 7 illustrates a process for transmitting PDSCH (Physical Downlink Shared Channel), a physical uplink control channel (PUCCH) and a physical uplink shared channel (PUSCH).

FIG. 7 is a diagram that illustrates timings of transmitting a physical downlink shared channel (PDSCH), a physical uplink control channel (PUCCH), and a physical uplink shared channel (PUSCH) and allocation methods therefor.

In FIG. 7, K0 represents the number of slots from a slot with a PDCCH carrying DL assignment (i.e., DL grant) to a slot with corresponding PDSCH transmission, K1 represents the number of slots from a slot with a PDSCH to a slot with corresponding HARQ-ACK transmission, and K2 represents the number of slots from a slot with a PDCCH carrying a UL grant to a slot with corresponding PUSCH transmission. That is, K0, K1, and K2 may be briefly summarized as shown in Table 2 below.

TABLE 2

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

The may provide a HARQ-ACK feedback timing to the dynamically by DCI or semi-statically by RRC signaling. Referring to FIG. 7, the UE may detect a PDCCH in slot #n. The PDCCH includes DL scheduling information (e.g., DCI format 1_0 and/or DCI format 1_1). The PDCCH indicates a DL assignment-to-PDSCH offset K0 and a PDSCH-to-HARQ-ACK reporting offset K1. DCI format 1_0 and DCI format 11 may include, for example, the following information.

- Frequency domain resource assignment: indicates an RB resource assigned to a PDSCH (e.g., one or more (dis)continuous RBs).
- Time domain resource assignment: indicates K0 and the starting position (e.g., OFDM symbol index) and length (e.g., the number of OFDM symbols) of a PDSCH in a slot.
- PDSCH-to-HARQ_feedback timing indicator: indicates K1.
- HARQ process number (4 bits): indicates a HARQ process identity (ID) for data (e.g., a PDSCH or a TB).
- PUCCH resource indicator (PRI): indicates a PUCCH resource to be used for UCI transmission among a plurality of PUCCH resources in a PUCCH resource set.

Next, the UE may receive a PDSCH in slot #(n+K0) according to scheduling information of slot #n and then transmit UCI on a PUCCH in slot #(n+K1). The UCI includes a HARQ-ACK response to the PDSCH. In the case in which the PDSCH is configured to carry a maximum of one TB, the HARQ-ACK response may be configured as one bit. In the case in which the PDSCH is configured to carry up to two TBs, the HARQ-ACK response may be configured as two bits if spatial bundling is not configured and as one bit if spatial bundling is configured. When slot #(n+K1) is designated as a HARQ-ACK transmission timing for a plurality of PDSCHs, UCI transmitted in slot #(n+K1) includes HARQ-ACK responses to the plurality of PDSCHs.

Referring to FIG. 7, the UE may detect a PDCCH in slot #n. The PDCCH includes UL scheduling information (e.g., DCI format 0_0 and/or DCI format 0_1). DCI format 0_0 and DCI format 0_1 may include the following information.

- Frequency domain resource assignment: indicates an RB set assigned to a PUSCH.
- Time domain resource assignment: indicates a slot offset K2 and the starting position (e.g., symbol index) and length (e.g., the number of OFDM symbols) of a PUSCH in a slot. The starting symbol and length may be indicated by a start and length indicator value (SLIV) or may be indicated individually.
- Thereafter, the UE may transmit the PUSCH in slot #(n+k2) according to the scheduling information of slot #n. Here, the PUSCH includes a UL-SCH TB.

Minimum Applicable Scheduling Offset

When the UE is configured with minimumSchedulingOffsetK0/K2, a change in the minimum scheduling offset restriction (K0min/K2min) may be indicated by the 'minimum applicable scheduling offset indicator' field in (PDSCH/PUSCH) scheduling downlink control information (DCI). When the change in the minimum scheduling offset restriction is indicated by the scheduling DCI, the UE may not expect the value of K0/K2 indicated by DCI to be less than Ceil {K0min(2u'/2u)} or Ceil{K2min(2u'/2u)} from the time the change is applied onward. In other words, the value of K0/K2 indicated by the DCI needs to be equal to or greater than Ceil {K0min(2u'/2u)} or Ceil{K2min(2u'/2u)}, where u' represents the numerology of a new active BWP when there is a change in the active BWP, and u represents the numerology of the active (DL/UL) BWP of a scheduled cell when the DCI is received.

When the UE is configured with minimumSchedulingOffsetK0/K2, if the UE does not receive the 'minimum applicable scheduling offset indicator' field in DCI, the UE may consider that K0min/K2min corresponding to the value '0' in the 'minimum applicable scheduling offset indicator' field is indicated.

However, since a search space (SS) set associated with control resource set (CORESET) Type 0 is related to recoverySearchSpaceSetId, K0min is not applied when a PDSCH is scheduled based on a default PDSCH time domain resource allocation table or when the PDSCH is scheduled based on an SI-RNTI, MSGB-RNTI, or RA-RNTI.

In addition, K2min is not applied when a PUSCH is scheduled by a Random Access Response (RAR) UL grant or fallback RAR UL grant or when the PUSCH is scheduled based on a TC-RNTI.

Application Timing of K0min/K2min

If new K0min/K2min is indicated by DCI, existing K0min/K2min is applied until new K0min/K2min is applied. If both an indication for changes in K0min/K2min and an indication for active BWP switching are received in a single DCI, new K0min/K2min may be applied from a slot corresponding to the K0/K2 values indicated by the DCI.

If an indication for changes in K0min/K2min is received in DCI without an indication for active BWP switching, new K0min/K2min may be applied from slot (n+X). In this case, slot n is a slot where the DCI is received. If the DCI is received within the first three symbols of slot n, X is defined as X=max{Ceil[K0minold ($2^{uPDCCH}/2^{uPDSCH}$)], $Z_u$}, where K0minold is currently applied K0min. If minimumSchedulingOffsetK0 is not configured, K0minold is 0.

In this case, uPDCCH and uPDSCH denote the subcarrier spacing (SCS) for a PDCCH of the active BWP of a scheduling cell and the SCS for a PDSCH of the active BWP of a scheduled cell, respectively, and $Z_u$ is determined depending on the SCS of the scheduling cell in slot n as shown in Table 3.

TABLE 3

| μ | $Z_u$ |
|---|---|
| 0 | 1 |
| 1 | 1 |
| 2 | 2 |
| 3 | 2 |

If the DCI is receive in symbols other than the first three symbols of slot n, the value of $Z_u$ according to [Table 3] increases by 1 before X is determined. In other words, if the DCI is received on symbols other than the first three symbols of slot n, X is defined as X=max{Ceil[K0minold ($2^{uPDCCH}/2^{uPDSCH}$)], $Z_u$+1}. This is to allow the time required to decode the DCI by delaying the application time by one slot if the DCI is received in symbols behind the first three symbols. Additionally, when an indication for changes in K0min/K2min is received by DCI without an indication for active BWP switching, if different DCI indicating active BWP switching is received before slot (n+X), new K0min/K2min may be applied from the first slot among slots that does not precede slot (n+X), based on the SCS of the active BWP in slot n.

Physical Downlink Control Channel (PDCCH)

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 4 lists exemplary PDCCH SSs.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be use to schedule a TB-based or TB-level) PUSCH, an DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs. DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

Signal Transmission and Reception Based on a Configured Grant or Semi-Persistent Scheduling (SPS)

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 21). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 01). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without Li signaling).

Type 2: the periodicity of a UL grant is configured by higher-layer signaling, and activation/deactivation of the CG is signaled by a PDCCH, to provide the UL grant.

Figure 8:
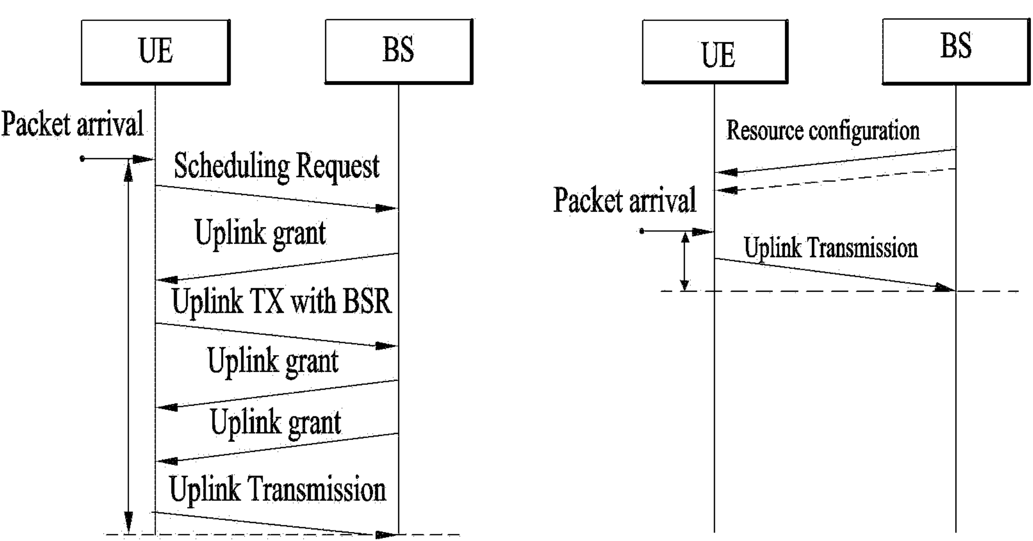
FIG. 8 illustrates exemplary uplink (UL) transmission operations of a user equipment (UE).

FIG. 8 illustrates exemplary UL transmission operations of a UE. The UE may transmit an intended packet based on a DG (FIG. 8(*a*)) or based on a CG (FIG. 8(*b*)).

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

Meanwhile, embodiments to be described later may be applied to, for example, extended reality (XR). XR is a concept that encompasses augmented reality (AR), virtual reality (VR), and mixed reality (MR). XR is characterized in that a timing when traffic is expected to be received is fixed to frames per second (fps) and traffic may be received later or earlier than the expected timing due to the influence of jitter. This jitter of XR traffic is represented as a truncated Gaussian probability distribution. Therefore, a power saving effect may be expected by cyclically configuring DRX according to fps. Even when DRX is not configured, if PDCCH monitoring adaptation is configured, the power saving effect may be expected only by PDCCH monitoring adaptation. It is apparent that the power saving effect may also be expected by configuring both DRX and PDCCH monitoring adaptation.

An expected traffic reception timing and an expected reception timing which is caused by the effect of jitter may be expressed as a probability, and embodiments to be described later may be applied to achieve the power saving effect in an XR environment as described above.

For example, since a jitter probability is low and thus a traffic reception probability is low at a timing which is relatively distant in time from the expected traffic reception timing, the UE may save power by sparsely monitoring a PDCCH. Conversely, since the jitter probability is high and thus the traffic reception probability is high at a timing which is close in time to the expected traffic reception timing, the UE may adjust power consumption according to the reception probability by densely monitoring the PDCCH. For this purpose, SS set group #0 may be configured as an SS set group including an SS set for dense PDCCH monitoring, and SS set group #1 may be configured as an SS set group including an SS set for sparse PDCCH monitoring. In other words, SS set Switching operation may be configured considering jitter in XR. In other words, an SS set switching operation may be configured considering jitter in XR.

As another example, the UE may repeat an operation of performing PDCCH monitoring during a short duration in which the traffic reception probability is high due to a high jitter probability and then entering micro-sleep. Therethrough, when traffic is not normally received, the UE may quickly enter micro-sleep to achieve power saving and then perform PDCCH monitoring to receive retransmitted traffic, thereby increasing the efficiency of PDCCH monitoring. In other words, a PDCCH monitoring skipping operation may be configured considering jitter in XR.

While the present disclosure proposes an operation through DCI reception within a DRX active time as an example, an operation of the same scheme may be applied to a UE for which DRX is not configured.

The present disclosure proposes methods for a UE to perform a corresponding indication when a PDCCH monitoring adaptation operation is indicated to the UE to which a Discontinuous Reception (DRX) operation is indicated for a power saving gain. In general, the PDCCH monitoring adaptation may refer to an operation for reducing the number of PDCCH monitoring.

Maximum 10 Search Space (SS) sets per BWP may be configured for the UE. In addition, the UE may monitor PDCCH candidates included in the SS sets (hereinafter, SS set monitoring).

Since the UE needs to perform Blind Decoding (BD) on a PDCCH of which reception timing point and DCI format are unknown, PDCCH monitoring during the DRX operation occupies a large proportion of power consumption.

As a technique for power saving of a wireless communication system (e.g., Rel-17 NR system, etc.), there is ongoing discussion on PDCCH monitoring adaptation that adjusts the number of PDCCH monitoring to reduce power consumption within a DRX active time.

Examples for PDCCH monitoring adaptation include a PDCCH monitoring skipping (hereinafter, skipping) and SS set group switching (hereinafter, switching). The PDCCH monitoring skipping stops PDCCH monitoring for a certain period (e.g., PDCCH monitoring skipping duration). The Search Space Set Group (SSSG) switching divides configured SS Sets into a plurality of groups and indicates switching for one group according to the purpose of use among a plurality of the groups, thereby monitoring an SS set included in the corresponding group.

Meanwhile, in the present disclosure, for convenience of description, SSSG is divided into SSSG #0 and SSSG #1. Here, SSSG #0 is an SSSG in which a relatively large number of SS sets are included or a period of an included SS set is relatively short in order to increase the number of PDCCH monitoring when an expected data transmission amount is large. SSSG #1 is an SSSG in which a relatively small number of SS sets are included or a period of an included SS set is relatively long to reduce the number of PDCCH monitoring for the purpose of power saving.

For PDCCH monitoring adaptation, a base station may indicate information related to PDCCH monitoring adaptation to a UE by using various DCI formats.

Meanwhile, the UE may perform a PDCCH monitoring adaptation operation differently according to an indicated PDCCH monitoring adaptation and a DCI used to indicate the corresponding PDCCH monitoring adaptation. For example, according to an indicated PDCCH monitoring adaptation and a DCI used to indicate the corresponding PDCCH monitoring, a corresponding PDCCH monitoring adaptation operation (e.g., an SSSG switching or a PDCCH monitoring skipping) the UE should perform and a timing point of the corresponding PDCCH monitoring adaptation operation may become different.

On the other hand, a performing/applying timing point of a PDCCH monitoring adaptation operation is indicated, it may be indicated that the PDCCH monitoring adaptation is performed/applied after a predetermined period from a timing point of receiving a DCI indicating the corresponding PDCCH monitoring adaptation. For example, the predetermined period may be expressed in the number of slots and/or the number of symbols or a time unit such as 'ms', or may be expressed based on an operation of a specific UE. Meanwhile, the predetermined period may be expressed as an application delay.

In the present disclosure, proposed is a method capable of differently applying an application delay based on a type of DCI received by a UE and a PDCCH monitoring adaptation operation indicated through the corresponding DCI. Rel-17 power saving discussion has proposed candidates of an applicable application delay.

Based on this, in the present disclosure, detailed operations of a UE based on an application delay are defined. In addition, a situation to which an application delay is applied, a reference to which an application delay is applied, and an example of applying an actual application delay are proposed. In the present disclosure, for convenience, an example in which two SSSGs exist illustrated, but the number of SSSGs is not necessarily limited to two and may be set to three or more.

Although the methods proposed in the present disclosure are described based on C-DRX applied to the UE in the RRC_CONNECTED state, the methods are not limited thereto. For instance, it may be understood by those skilled in the art that the methods may be applied to other methods where a specific duration in which the UE does not need to expect reception of DL signals is defined with periodicity (for example, DRX applied to the UE in the RRC_IDLE state)

Thus, it is evident that unless specified otherwise, the methods proposed in the present disclosure are applicable to various types of transmission and reception methods expected by both the BS and UE as long as the principles of the proposed methods are not violated.

Throughout this specification, the term "DRX" is used as a general concept encompassing the terms "C-DRX."

While the present disclosure describes the principles of the proposed methods based on the NR system, the proposed methods are not limited to NR transmission and reception formats unless otherwise specified. The present disclosure provides examples based on the characteristics and structure of the UE supporting C-DRX to explain the principles of the proposed methods, the proposed methods are not limited to the UE supporting C-DRX unless otherwise specified. Therefore, the methods proposed in the present disclosure may be applied to the structure and services of all wireless communication transmission and reception unless the principles of the proposed methods are violated.

In the following description, the classification of methods or options is intended to clarify the description, and the classification is not limitedly interpreted to mean that each should be practiced independently. For example, although each of the methods/options described below may be independently implemented, but at least some of the methods/options may be combined to the extent that they do not conflict with each other.

In the present disclosure, a Base Station (BS) may configure a PDCCH monitoring adaptation operation to a UE. Through this, it is possible to improve the power saving efficiency of a UE and reduce the transmission and reception latency of control/traffic information.

To this end, in the proposed method, a UE may receive information related to a PDCCH monitoring adaptation operation from a base station. In addition, a method for the UE to monitoring a PDCCH, receive a PDSCH (or PUSCH), and perform a PDCCH monitoring adaptation operation based on the corresponding PDCCH monitoring adaptation operation may be included.

The method of performing the PDCCH monitoring adaptation operation may include information about a timing point at which the UE performs the PDCCH monitoring adaptation operation.

Meanwhile, a following method may be included. First, the base station determines and configures information related to the PDCCH monitoring adaptation operation, informs the UE of the information, transmits a Physical Downlink Control Channel (PDCCH), a Physical Downlink Shared Channel (PDSCH), and/or a Physical Uplink Shared Channel (PUSCH) based on the corresponding information, and determines a PDCCH monitoring adaptation operation. In addition, in the proposed method, the UE may transmit a signal and a channel for notifying the capability of its own, and the base station may receive them.

An overall process of operating a UE and a base station according to proposed methods of the present disclosure will be described with reference to FIGS. 9 to 11.

Figure 9:
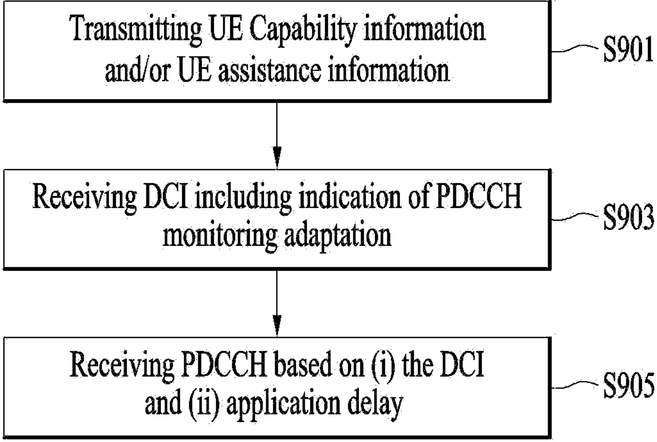
FIGS. 9 to 11 are diagrams for explaining the overall operation processes of a UE and a BS according to an embodiment of the present disclosure.

FIG. 9 is a diagram for describing an overall operation process of a UE according to proposed methods of the present disclosure.

In order to support an operation proposed by the present disclosure, a UE may transmit capability information and/or UE assistance information to a base station (S901). For example, information for determining an application delay may be included in the capability information and/or the UE assistance information. The step S901 may be skipped in a specific situation (for example, when the base station already has advance information or each operating scheme is changed due to a need for the base station).

In order to support the operation proposed by the present disclosure, the UE may receive information for configuring a PDCCH monitoring adaptation transmitted by the base station. For example, the corresponding information may be received using a higher layer signal (e.g., System Information Block (SIB) or RRC signaling). In addition, based on the information received through the higher layer, the UE may receive Downlink Control Information (DCI) including an indicator of the PDCCH monitoring adaptation (S903). In other words, one of configurations related to a plurality of PDCCH monitoring adaptation operations provided semi-statically to the UE may be received through a specifically indicated scheme (e.g., DCI or MAC CE/header).

Based on the received DCI and an application delay according to an embodiment of the present disclosure, the UE may expect a receivable timing point of PDCCH, PDSCH, and/or PUSCH, determine a timing point of performing a PDCCH monitoring adaptation operation, and receive a PDCCH according to the corresponding PDCCH monitoring adaptation operation (S905).

A specific operation process of the UE according to the steps S903 to S905 may be based on at least one of [Embodiment #1] to [Embodiment #3].

Figure 10:
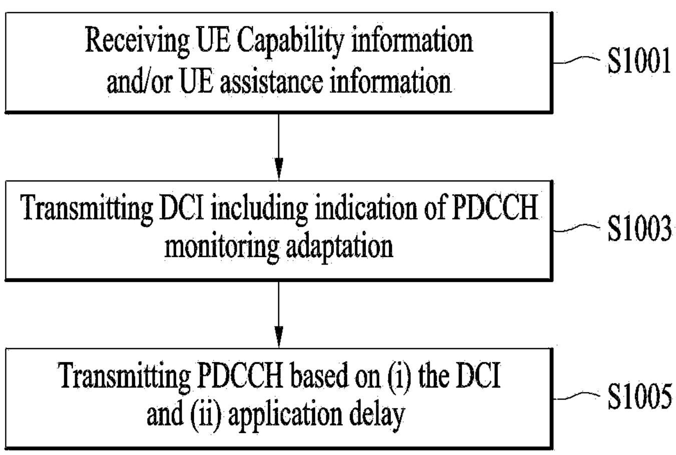

FIG. 10 is a diagram for describing an overall operation process of a base station according to proposed methods of the present disclosure.

Referring to FIG. 10, a base station may receive capability information and/or UE assistance information from a UE to support an operation proposed in the disclosure (S1001). For example, information for determining an application delay may be included in the capability information and/or the UE assistance information. The step S1001 may be skipped in a specific situation (for example, when the base station already has advance information or each operating scheme is changed due to a need for the base station).

In order to support the operation proposed by the disclosure, the base station may transmit information for configuring a PDCCH monitoring adaptation to the UE. For example, the corresponding information may be received using a higher layer signal (e.g., System Information Block (SIB) or RRC signaling). In addition, the base station may transmit, based on the information received through the higher layer, Downlink Control Information (DCI) including an indicator of the PDCCH monitoring adaptation (S1003). In other words, one of the configurations related to a plurality of PDCCH monitoring adaptation operations provided to the UE in a semi-static manner may be transmitted through a specifically indicated scheme (e.g., DCI or MAC CE/header).

Based on the DCI and an application delay according to an embodiment of the present disclosure, the base station may expect a transmittable timing point of PDCCH, PDSCH, and/or PUSCH, determine a timing point of performing the PDCCH monitoring adaptation operation, and transmit the PDCCH according to the corresponding PDCCH monitoring adaptation operation (S1005).

The detailed operation of the base station according to steps S1003 to S1005 may be based on at least one of [Embodiment #1] to [Embodiment #3].

Figure 11:
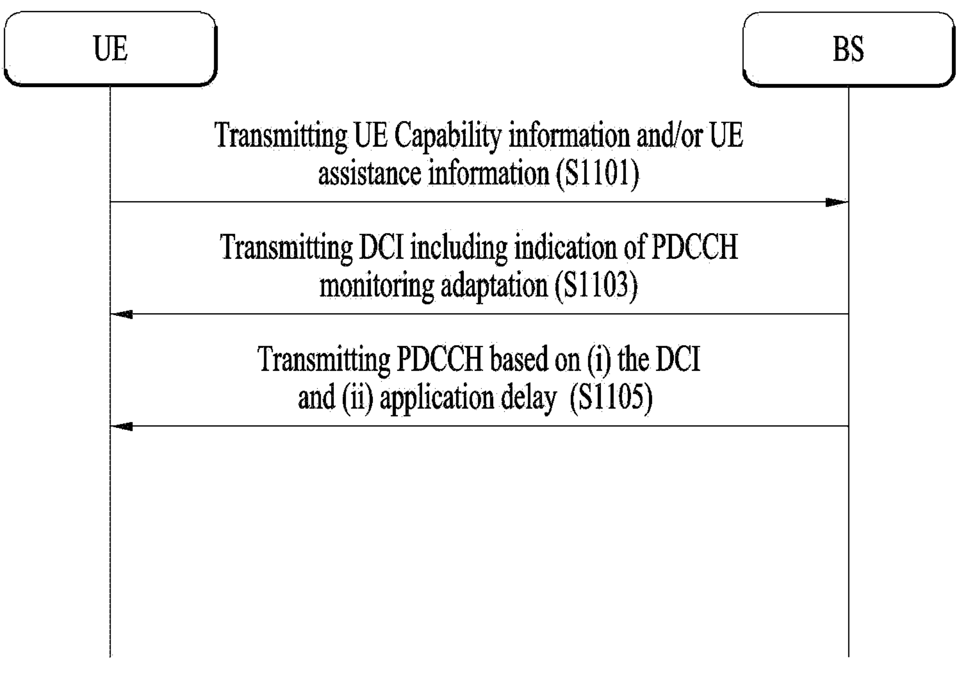

FIG. 11 is a diagram for describing an overall operation process of a network according to proposed methods of the present disclosure.

Referring to FIG. 11, in order to support the operation proposed by the present disclosure, a UE may transmit capability information and/or UE assistance information to a base station (S1101). For example, information for determining an application delay may be included in the capability information and/or the UE assistance information. The step S1101 may be skipped in a specific situation (e.g., when the base station already has advance information or each operating scheme is changed due to a need for the base station).

In order to support the operation proposed by the disclosure, the base station may transmit, to the UE, information for configuring a PDCCH monitoring adaptation to the UE. For example, the corresponding information may be received using a higher layer signal (e.g., System Information Block (SIB) or RRC signaling). In addition, based on the information transmitted through the higher layer, the base station may transmit, to the UE, Downlink Control Information (DCI) including an indicator of the PDCCH monitoring adaptation (S1103). In other words, one of the configurations related to a plurality of PDCCH monitoring adaptation operations provided to the UE in a semi-static manner may be transmitted through a specifically indicated scheme (e.g., DCI or MAC CE/header).

Based on the DCI and an application delay according to an embodiment of the present disclosure, the base station may expect a transmittable timing point of PDCCH, PDSCH, and/or PUSCH, determine a timing point of performing the PDCCH monitoring adaptation operation, and transmit the PDCCH to the UE according to the corresponding PDCCH monitoring adaptation operation (S1105).

A detailed operation process of the network according to the steps S1103 to S1105 may be based on at least one of [Embodiment #1] to [Embodiment #3].

In other words, the method proposed in the disclosure may be applied by selecting some of the following methods. Each of the methods may operate independently without a separate combination, or one or more methods may operate by being combined and linked together. Some terms, symbols, orders, and the like used for the description of the proposed methods may be replaced by other terms, symbols, orders, etc. as long as the principles of the proposed methods are maintained.

Hereinafter, in order to describe the principles of the present disclosure, an SSSG switching operation is described in a manner of taking an example of a random structure of SSG switching for the purpose of power saving which is being discussed to be introduced into the Rel-16 NR standard by including an Rel-16 NR standard based SSG switching operation. Yet, the proposed methods do not specify and limit a type of an SSSG switching operation of a UE unless there is separate description. In addition, since the SSSG switching for the power saving is commonly designed as a PDCCH monitoring adaptation operation together with a PDCCH monitoring skipping, methods described as examples of the SSSG switching are equally applicable to the PDCCH monitoring skipping.

In addition, in the present disclosure, a timing point of performing a PDCCH monitoring adaptation operation is described by taking a random application delay as an example in order to describe the principles of the present disclosure, but the proposed methods are non-limited by specifying an application delay unless there is a separate description.

Therefore, although there is no separate description, the methods proposed in the present disclosure are obviously applicable to a PDCCH monitoring operation according to any DCI transmission and reception and a timing point of performing the corresponding PDCCH monitoring operation unless the principles of the proposed methods are infringed.

In the present disclosure, detailed operations of a UE and a base station with respect to the proposed application delay are defined, and applicable actual examples are proposed. It can be expected that the UE can perform a PDCCH monitoring adaptation without any problem by applying a different application delay for each Downlink Control Information (DCI) reception situation.

An application delay considered in the proposal of the present disclosure is as follows.

1) Application delay in time unit

2) After UpLink (UL) transmission of UE

3) Zero application delay

A PDCCH monitoring adaptation may be indicated through various DCI formats. For example, it may be classified into a scheduling DCI including a PDCCH monitoring adaptation together with scheduling information of PDSCH/PUSCH of a UE and a non-scheduling information including a PDCCH monitoring adaptation only without the scheduling information. Based on the scheduling DCI, the UE may perform a UL transmission such as HARQ-ACK for a PUSCH transmission or a Downlink (DL) transmission. In addition, in the case of DCI for releasing Semi-Persistent Scheduling (SPS), PDSCH scheduling information is not included, but an HARQ-ACK transmission may be required for the UE.

The PDCCH monitoring adaptation may be classified into two types according to an indication purpose of a base station. The first one is to reduce the number of PDCCH monitoring of the UE and to reduce the power consumption of the UE by determining that there is little or no data traffic expected by the base station for the purpose of power saving. To this end, the base station may indicate a PDCCH monitoring skipping or an SSSG switching from SSSG #0 to SSSG #1. In the present disclosure, for convenience of description, this is referred to as 'a first PDCCH monitoring adaptation'.

Meanwhile, as an SSSG requiring a dense PDCCH monitoring, SSSG #0 is an SSG that requires a relatively large number of PDCCH monitorings because the number of SS sets included in the corresponding SSSG is large or a PDCCH Monitoring Occasion (MO) is frequent (e.g., a period of a PDCCH MO is short). On the other hand, as an SSG requiring a sparse PDCCH monitoring, SSSG #1 is an SSSG requiring a relatively small number of PDCCH monitorings because the number of SS sets included in the corresponding SSSG is small or the PDCCH MO is not frequent (e.g., a period of PDCCH MO is long). An example of a first PDCCH monitoring may also include an SSSG switching to a dormant-SSSG (e.g., a group in which an SS set is configured for HARQ retransmission only).

The second one may be referred to as a PDCCH monitoring of a UE to which a PDCCH monitoring adaptation for the purpose of power saving to facilitate data transmission. After the UE performs a PDCCH monitoring adaptation for a predetermined time, the UE returns to a general PDCCH monitoring and performs the PDCCH monitoring adaptation, or a PDCCH monitoring adaptation such as an SSSG switching to SSSG #0 from SSSG #1. For convenience of description of the present disclosure, this is referred to as 'a second PDCCH monitoring adaptation'.

Meanwhile, in the present disclosure, if the meaning can be clearly understood by those skilled in the art without confusion, expression of 'first/second' may be skipped. For example, the PDCCH monitoring adaptation may mean either the first PDCCH monitoring adaptation or the second PDCCH monitoring adaptation, or may mean both the first/second PDCCH monitoring adaptation, according to the flow of the description.

[Embodiment #1] Application Delay and Detailed Operation of UE According Thereto

1. Embodiment #1-1: Application Delay in Time Unit

An application delay of a time unit may be utilized for an application delay of the Rel-16 SSSG switching and an application delay until new K0min/K2min is applied. An SSSG switching may be performed at a slot boundary after $P_{switch}$ symbols from a DCI reception timing point. For example, the minimum value of $P_{switch}$ per UE processing capability is defined by the standard document 3GPP TS 38.213 as shown in Table 1 described above.

Meanwhile, $K_{0min}/K_{2min}$ is a minimum applicable scheduling offset that can be applied to the UE through PDCCH with a minimum value of $K_0/K_2$ value indicating whether PDSCH/PUSCH is scheduled after a prescribed number of slots since a PDCCH reception timing point. In case that a change of $K_{0min}/K_{2min}$ is indicated in a slot n through DCI, a value of the $K_{0min}/K_{2min}$ may be changed in a slot (n+X), where X may be determined according to Equation 1 below.

$$X = \max\left(\left\lceil K_{0minOld} \cdot \frac{2^{\mu_{PDCCH}}}{2^{\mu_{PDSCH}}} \right\rceil, Z_\mu\right) \quad \text{[Equation 1]}$$

$K_{0minOld}$ means $K_{0min}$ before the change, and $K_{2minOld}$ can be used to calculate $K_{2min}$. $Z_\mu$ is defined by the standard document TS38.214 as shown in Table 3.

Both the above-described two application delays (i.e., an application delay for an SSSG switching and an application delay for a change of $K_{0min}/K_{2min}$) may be applied in units of slots. In general, PDCCH monitoring of a UE may be performed in a slot unit. Accordingly, an application delay in a slot unit may be a gain in terms of scheduling of a base station.

Yet, considering a PDCCH monitoring skipping, an application delay in a symbol unit may be required. In this case, when a PDCCH monitoring skipping in a symbol unit is indicated, since the UE does not perform a PDCCH monitoring for a period in a specific symbol unit, if a start timing point for performing a PDCCH monitoring again after ending the PDCCH monitoring skipping is set to be a first symbol of a slot, it may be a gain in the scheduling viewpoint of the base station.

Meanwhile, if the UE fails to receive a PDCCH monitoring skipping indication for stopping the PDCCH monitoring, it may not be problematic. For example, although the base station has indicated not to monitor a PDCCH for the purpose of power saving of the UE since there is no expected transmission, even if the UE is still monitoring the PDCCH, there is only a problem in power consumption but there may be no problem in data transmission and reception.

Meanwhile, in a PDCCH monitoring adaptation operation after a predetermined time since indicating the PDCCH monitoring adaptation to the UE through the DCI, a problem due to DCI mission and the like may occur since there is no response of the UE to whether the corresponding DCI has been properly received.

For example, although an SSSG switching is indicated, if the UE fails to receive a DCI indicating the corresponding SSSG switching, a UE's monitoring SSG expected by the base station and a UE's actual monitoring SSSG may mismatch (hereinafter, referred to as SSSG misalignment for convenience of the disclosure). However, if the UE fails to receive the SSSG switching from SSSG #0 to SSSG #1, it may not be problematic. This is because even if the UE fails to receive the SSSG switching indication for decreasing the PDCCH monitoring count, the SSG switching indication may not cause a problem to data transmission and reception but causes a problem to power consumption only like the PDCCH monitoring skipping.

In addition, through [Embodiment #1-1], a minimum processing for decoding the DCI may be guaranteed to the UE according to the capability of the UE, thereby inducing a power saving effect of the UE.

2. Embodiment #1-2: After UL Transmission of UE

When a PDCCH monitoring adaptation is indicated together with PUSCH scheduling, a UE may perform the corresponding PDCCH monitoring adaptation after transmitting a scheduled PUSCH. Meanwhile, when a PDCCH monitoring adaptation is indicated together with PDSCH scheduling, the UE may receive a scheduled PDSCH, transmit an HARQ-ACK corresponding to the corresponding PDSCH, and then perform the corresponding PDCCH monitoring adaptation. When a PDCCH monitoring adaptation is indicated through an SPS release DCI, the UE may perform the corresponding PDCCH monitoring adaptation after transmitting an HARQ-ACK for an SPS release.

In addition to receiving a NACK by the base station from the UE, when the UE fails to transmit an HARQ-ACK due to a problem of failure in receiving a DCI by the UE or the like or a base station fails to receive an HARQ-ACK transmitted by the UE, the base station determines it as a NACK. As described above, if the UE does not transmit an HARQ-ACK or the base station determines a NACK due to failure in receiving the HARQ-ACK, it is referred to as an implicit NACK. If the UE transmits the NACK and the base station receives it, it is referred to as an explicit NACK.

When the UE explicitly transmits a NACK, the UE may not perform a PDCCH monitoring adaptation operation. If the UE fails to receive/decode a scheduled PDSCH, the UE transmits a NACK and then performs a retransmission procedure of PDSCH. Therefore, a PDCCH monitoring for retransmission of the corresponding PDSCH is required for the UE. Yet, if the PDCCH monitoring adaptation is a PDCCH monitoring skipping, the UE may not be able to monitor a PDCCH indicating retransmission of the PDSCH.

Meanwhile, if an SSSG switching is indicated to the UE, a problem may not occur because a PDCCH indicating retransmission may be monitored even after a PDCCH monitoring adaptation. Yet, even in this case, an SS set for HARQ retransmission (e.g., retransmission of a PDSCH) should be included in an SSSG monitored by the UE, which may mean that a PDCCH monitoring for the retransmission of the PDSCH should be performed through all SS sets included in the SSSG for multiple HARQ processes of the UE.

The UE transmits a NACK explicitly or implicitly and performs a monitoring of a PDCCH for the retransmission of the PDSCH after elapse of a predetermined time (e.g., a retransmission round-trip timer). In this case, the base station may transmit a new PDCCH monitoring adaptation indication through a retransmission scheduling DCI. The UE may expect a new PDCCH monitoring adaptation indication through a retransmission PDCCH monitoring after the NACK. If the UE receives a new PDCCH monitoring adaptation, a previous PDCCH monitoring adaptation indication may be ignored. If the UE fails to receive a new PDCCH monitoring adaptation indication, the UE may perform a previously received PDCCH monitoring adaptation indication after termination of the retransmission procedure (e.g., ACK transmission of the UE). In the case of the multiple HARQ processes, a PDCCH monitoring adaptation indication may be performed after ACK transmission for a last terminated HARQ process. Meanwhile, transmitting the new PDCCH monitoring adaptation indication by the base station may be based on a determination that performing the previous PDCCH monitoring adaptation indication by the UE at the current time is not correct.

After UL transmission of the UE, a PDCCH monitoring adaptation may depend on K1 that is a timer for an HARQ-ACK and K2 that is a timer for PUSCH preparation from the perspective of a time domain. Therefore, a UE's PDCCH monitoring adaptation timing point and whether to apply the PDCCH monitoring adaptation after the UL transmission may become different with reference to K1 and K2.

For example, a threshold of K1 and K2 may be preset/indicated by the base station or includes a predetermined value. In this case, if a value of the K1 or K2 exceeds the threshold, an application delay of a time unit may be applied even if a basic operation of the UE is a PDCCH monitoring adaptation after UL Transmission.

In other words, if K1 and/or K2 exceeds the threshold, the UE should wait too long to apply the PDCCH monitoring adaptation after the UL transmission and cannot perform a subsequent procedure/operation based on PDCCH monitoring adaptation, so that the PDCCH monitoring adaptation indication may become useless, and thus PDCCH monitoring adaptation may be performed by applying the time-unit application delay from a reception timing point of a scheduling DCI.

In addition, according to [Embodiment #1-2], a PDCCH monitoring adaptation is performed after completing HARQ-ACK transmission for a PDSCH and PUSCH transmission, thereby ensuring completion of a retransmission procedure of a PDSCH and stably performing transmission and reception of PDSCH/PUSCH scheduled to a UE. That is, owing to the PDCCH monitoring adaptation, it is possible to prevent a situation in which a scheduling DCI for a re-scheduled PDSCH/PUSCH is not detected, thereby enabling stable transmission and reception of PDSCH/PUSCH.

3. Embodiment #1-3: Zero Application Delay

A UE may perform a PDCCH monitoring adaptation based on a zero application delay. The zero application delay may mean that an application delay is not applied substantially.

Since the UE is unable to know the content that is to be indicated through a DCI until decoding the DCI, decoding of the DCI should be completed in advance in order to perform the indication.

However, since decoding capability is generally different for each UE in general, buffering may be performed by considering that a PDSCH scheduled by the corresponding DCI is received in the same slot.

Accordingly, a base station may determine a duration of the PDCCH monitoring adaptation operation in consideration of a decoding time different for each UE and indicate a PDCCH monitoring adaptation through a DCI. And, the UE may be expected to perform the PDCCH monitoring adaptation operation on the basis of a timing point (e.g., symbol or slot) of receiving the DCI. For example, if the UE has completed decoding in a slot n+1 by receiving a PDCCH monitoring skipping indication of 4 slots in a slot n, the UE may count four slots from the slot n and maintain the PDCCH monitoring skipping operation until a slot n+3. That is, the UE may skip a PDCCH monitoring for 4 slots from the slot n. Yet, according to the definition of a PDCCH monitoring skipping, a slot period for skipping the PDCCH monitoring may be different depending on the reception is made at which symbol in the slot. For example, in order to secure a PDCCH monitoring adaptation of four slots to the minimum, if a PDCCH is received in a symbol after the $m^{th}$ symbol, the PDCCH monitoring adaptation can be maintained until a slot n+4 that is a slot next to the slot n+3.

Since there is no expected data traffic, the base station determines that the UE does not monitor the PDCCH for a predetermined time and indicates a PDCCH monitoring skipping. Therefore, assuming a negligible transmission delay, when a PDCCH monitoring skipping indication transmission timing point of the base station and a PDCCH monitoring skipping indication reception timing point of the UE are regarded as the same, it may be preferable that a PDCCH monitoring adaptation duration is determined from a timing point of the determination made by the base station.

In addition, by applying the application delay as 0, the base station may not consider a decoding time different for each UE. For example, the base station may indicate a PDCCH monitoring skipping of 4 slots to the UE of which $K_{0min}$ is 4 slots. In this case, the UE may receive a DCI and quickly decode the DCI or slowly decode the DCI using low power. However, since the UE fails to check the PDCCH monitoring skipping of 4 slots until decoding the corresponding DCI, if the UE slowly decodes the DCI using low power, the UE may still need to decode another PDCCH transmitted during 4 slots between a PDCCH and a scheduled PDSCH. On the other hand, when the UE decodes the DCI quickly, the base station may guarantee a certain micro-sleep to the UE until receiving the scheduled PDSCH.

Alternatively, when the indication of the PDCCH monitoring adaptation is an SSSG switching of 4 slots and the UE quickly decodes a DCI, it may be able to expect a power saving gain while monitoring a group of SS sets of which PDCCH is not frequent until receiving the scheduled PDSCH.

Meanwhile, even if the DCI including the indication of the PDCCH monitoring adaptation is slowly decoded using low power, there is no problem in the scheduled PDSCH reception but there may be some damage only in terms of power consumption of the UE. In this case, the duration of the PDCCH monitoring adaptation may not be explicitly configured in symbol, slot, or ms units. For example, the duration of the PDCCH monitoring adaptation may be configured on the basis of a next operation performed by the UE. For example, in the above case, like performing the corresponding PDCCH monitoring adaptation until the scheduled PDSCH reception or the scheduled PUSCH transmission from the DCI reception timing point, the duration may be configured based on the next operation the UE should perform on the corresponding DCI.

Although the base station indicates the PDCCH monitoring adaptation to the UE, when whether to perform the corresponding PDCCH monitoring adaptation by the UE affects the power consumption of the UE only but there is no problem in aspect of data transmission, the zero application delay may be suitable. Accordingly, the zero application delay may be suitable for the above-described first PDCCH monitoring adaptation indication.

According to [Embodiment #1-3], since an application delay is not applied to a PDCCH monitoring adaptation, a base station may indicate a PDCCH monitoring adaptation according to an amount of currently estimated data, and thus a PDCCH monitoring adaptation that best matches the purpose of the PDCCH monitoring adaptation may be performed. That is, the efficiency of indicating the PDCCH monitoring adaptation may be prevented from decreasing because of the need to estimate an amount of data to be generated after a predetermined time due to the application delay or the change in the amount of estimated data between a timing point of transmitting the PDCCH monitoring adaptation by the base station due to the application delay and a timing point of applying the PDCCH monitoring adaptation due to the application delay.

[Embodiment #2] Usage Example of Application Delay for Each Situation

1. Embodiment #2-1: Scheduling DCI

A UE may simultaneously receive a PDSCH/PUSCH scheduling and an indication of a PDCCH monitoring adaptation through DCI format 0_1, DCI format 0_2, DCI format 1_1, and/or DCI format 1_2. Having received a scheduling DCI, the UE should transmit an ACK DL/NACK for a PDSCH or a scheduled PUSCH. In other words, the scheduling DCI is necessarily accompanied by UL transmission of the UE. Therefore, if the PDCCH monitoring adaptation is indicated through the scheduling DCI to the UE, a PDCCH monitoring adaptation performance (i.e., Embodiment #1-2) after the UL transmission of the UE described above may be suitable.

The PUSCH scheduling and the PDCCH monitoring adaptation are indicated through DCI format 0_1 and/or DCI format 0_2, and the UE expects PUSCH transmission after K2 slots from a slot in which the DCI was received.

In this case, a base station may previously set K2_threshold for determining an application delay of a PDCCH monitoring adaptation operation of the UE through a higher layer parameter, or K2_threshold may be a value fixed for each cell or UE. When K2≤K2_threshold, the UE starts the PDCCH monitoring adaptation in a first symbol of a slot next to a slot including a symbol in which the scheduled PUSCH transmission is completed. In addition, the UE may perform the PDCCH monitoring adaptation operation for a fixed or indicated duration from a corresponding timing point. For example, referring to FIG. 12, the UE receives a PDCCH including DCI format 0_1 and/or DCI format 0_2 in a slot n, and K2_threshold is 5. If K2 obtained by decoding the DCI format 0_1 and/or DCI format 0_2 by the UE is 3, PUSCH transmission in a slot n+3 is expected, and thus, the UE may perform the PDCCH monitoring adaptation for a fixed or indicated duration from a slot n+4 (or a starting symbol of the slot n+4).

On the other hand, a PDCCH monitoring adaptation operation may be performed based on a symbol, in which PUSCH transmission is completed, instead of a start symbol of a slot next to a slot in which a PUSCH was transmitted to facilitate a scheduling in a slot unit.

A PDSCH scheduling and a PDCCH monitoring adaptation are indicated through DCI format 1_1 and/or DCI format 1_2, and the UE expects HARQ-ACK transmission from a slot, in which DCI is received, after K1 slots.

In this case, the base station may previously configure K1_threshold for determining an application delay of a PDCCH monitoring adaptation operation of the UE through a higher layer parameter, and the K1_threshold may be a value fixed for each cell or UE. When K1≤K1_threshold, the UE starts the PDCCH monitoring adaptation from a first symbol of a slot next to a slot in which an HARQ-ACK is transmitted. In addition, the UE may perform the PDCCH monitoring adaptation operation for a fixed or indicated duration from the corresponding timing point. For example, referring to FIG. 12, the UE receives a PDSCH scheduled by DCI format 1_1 and/or DCI format 1_2 in a slot n, and a case that K1_threshold is 5 is illustrated. If K1 obtained by decoding DCI format 1_1 and/or DCI format 1_2 by the UE is 3, transmission of an HARQ-ACK (or PUCCH) in a slot n+3 is expected, and thus, the UE may perform the PDCCH monitoring adaptation for a fixed or indicated duration from a slot n+4 (or a starting symbol of the slot n+4).

On the other hand, the PDCCH monitoring adaptation operation may be performed based on a symbol, in which HARQ-ACK (or PUCCH) transmission is completed, instead of a start symbol of a slot next to a slot in which an HARQ-ACK (or PUUCH) was transmitted to facilitate a scheduling of a slot unit.

When the base station receives a NACK explicitly or implicitly (i.e., including a NACK determination due to HARQ-ACK non-reception), the base station retransmits the DCI. The corresponding scheduling DCI may be a retransmission for the previous scheduled PDSCH/PUSCH or the same PDSCH/PUSCH as the previous scheduled PDSCH/PUSCH. When the UE receives new scheduling DCI, if a PDCCH monitoring adaptation indication is included in the corresponding scheduling DCI, the UE may ignore the PDCCH monitoring adaptation indication included in the previous DCI and perform the PDCCH monitoring adaptation indication included in the new DCI.

If a PDCCH monitoring adaptation indication is not included in the new DCI, the PDCCH monitoring adaptation indication included in the previous DCI is performed. The PDCCH monitoring adaptation indication included in the new DCI may correspond to a case in which the base station determines that the PDCCH monitoring adaptation indication included in the previous DCI is not suitable for the timing point of performing the PDCCH monitoring adaptation indication based on the new DCI. Alternatively, as the base station indicates a first PDCCH monitoring adaptation, it may be a case that the base station determines that SS sets included in the SSSG according to the PDCCH monitoring adaptation indication included in the previous DCI are not sufficient for the UE to perform an HARQ retransmission procedure.

Figure 12:
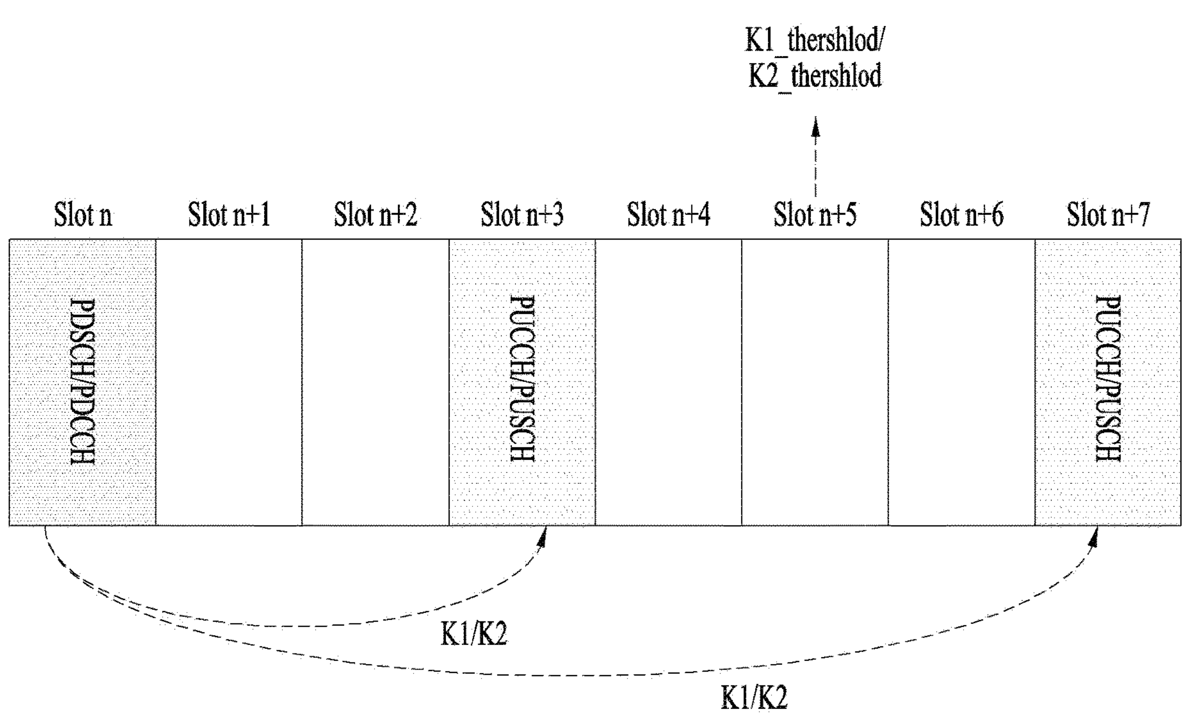

When K1≥K1_threshold or K2≥K2_threshold for a scheduled PDSCH/PUSCH in the received DCI, the UE may apply an application delay of a time unit. The application delay of the time unit may be K1_threshold/K2_threshold or a value determined based thereon. For example, as shown in FIG. 12, it is assumed that a PDSCH or PDCCH scheduled in a slot n is received and that K1_threshold/K2_threshold is 5. Yet, if K1/K2 is 7, since HARQ-ACK (or PUCCH)/PUSCH transmission is expected in a slot n+7, the UE may perform a PDCCH monitoring adaptation for a fixed or indicated duration from a slot n+5 (or a slot n+6 next to the slot n+5) by considering the K1_threshold/K2_threshold as an application delay.

This is to prevent an application timing point of the PDCCH monitoring adaption from being too late due to K1/K2.

Alternatively, as described above, it may be configured based on an application delay of the Rel-16 SSSG switching and an application delay until applying new $K_{0min}/K_{2min}$. A detailed example thereof will be described later in [Embodiment #3].

On the other hand, when K1≤K1_threshold or K2≤K2 threshold, the UE may apply an application delay as K1_threshold/K2_threshold (or a value set based on the application delay). This may ensure a minimum processing time of the UE. For example, referring to FIG. 12, the UE receives a PDSCH or PDCCH scheduled in a slot n, and K1 threshold/K2 threshold is 5. However, if K1/K2 is 3, transmission of HARQ-ACK (or PUCCH)/PUSCH is expected in a slot n+3. Hence, to ensure the minimum processing time of the UE, the UE may perform the PDCCH monitoring adaptation for a fixed or indicated duration from a slot n+5 corresponding to K1_threshold/K2_threshold or a slot n+6 that is a slot next to the slot corresponding to K1_threshold/K2_threshold.

Meanwhile, as shown in FIG. 13, a minimum value K1_threshold_min or K2_threshold_min and a maximum value K1_threshold_max or K2_threshold_max for an application delay of the UE may be simultaneously configured. In this case, Only when 1) K1_threshold_min≤K1≤K1_threshold_max and/or 2) K2 Threshold_Min≤K2≤K2_Threshold_Max is satisfied, K1/K2 is applied. If it is smaller than the minimum value, the maximum value may be applied as the application delay. If it is greater than the maximum value, the maximum value may be applied as the application delay. For example, referring to FIG. 13, the UE receives a PDSCH/PDCCH in a slot n, and K1_threshold_min/K2_threshold_min is 4, and K1_threshold_max/K2_threshold_max is 7. As K1/K2 is 3, if an HARQ-ACK (or PUCCH)/PUSCH is transmitted in a slot n+3, since K1/K2 is smaller than K1_threshold_min/K2_threshold_min, and thus, to ensure the minimum processing time of the UE, the PDCCH monitoring adaptation may be performed from a slot n+4 (or a slot n+5 that is a slot next to the slot n+4).

As K1/K2 is 5, if an HARQ-ACK (or PUCCH)/PUSCH is transmitted in a slot n+5, since K1/K2 is greater than K1_threshold_min/K2_threshold_min and smaller than K1_threshold_max/K2_threshold_max, it is able to perform a PDCCH monitoring adaptation from a slot n+6 that is a slot next to the slot n+5 (or a starting symbol of the slot n+6).

As K1/K2 is 8, if an HARQ-ACK (or PUCCH)/PUSCH is transmitted in a slot n+8, since K1/K2 is greater than K1_threshold_max/K2_threshold_max, it is able to perform a PDCCH monitoring adaptation from a slot n+7 or a slot n+9 that is a slot next to the slot n+7.

This ensures the minimum processing time of the UE through K1_threshold_min/K2 threshold_min, while preventing an application timing point of the PDCCH monitoring adaptation from being too late through K1_threshold_max/K2_threshold_max.

On the other hand, when a scheduling DCI is received by the UE in which K0min/K2min is configured, it is able to consider applying a monitoring adaptation with the zero application delay. In this case, a duration of the PDCCH monitoring adaptation is K0min/K2min from a timing point of the DCI reception. Through this, the UE may perform the PDCCH monitoring adaptation or no PDCCH monitoring adaptation for a time between the DCI reception timing point and the timing point of the scheduled PDSCH/PUSCH. In addition, through this, the base station may perform, on the UE, a PDCCH monitoring adaptation operation such as a PDCCH suspension monitoring stop operation for the corresponding time (that is, the time between the DCI reception timing point and the timing point of the scheduled PDSCH/PUSCH), thereby ensuring power saving.

2. Embodiment #2-2: Non-Scheduling DCI

Scheduling information for a PDSCH/PUSCH is not included in a DCI, and every DCI indicating a PDCCH monitoring adaptation operation may be referred to as a non-scheduling DCI. The non-scheduling DCI may include DCI format 2_6, DCI format 20, DCI format 1_1 (for SCell dormancy case 2), or the like. The DCI format 1_1 (for SCell dormancy case 2): 1) has no one-shot HARQ-ACK request field or is set to 0; and 2) means a case that all bits of a frequency domain resource assignment are set to 0 with respect to a resource allocation type 0, 1 with respect to a resource allocation type 1, and 0 or 1 with respect to a dynamic switch resource allocation type. In other words, it is DCI format 1_1 that does not include scheduling information and may also be referred to as non-scheduling DCI format 1_1.

Since the non-scheduling DCI is not accompanied by UL transmission of a UE, it is necessary to identify whether an indicated PDCCH monitoring adaptation is a PDCCH monitoring skipping or an SSSG switching.

If the PDCCH monitoring skipping is indicated to the UE through the non-scheduling DCI, the UE may perform the PDCCH monitoring adaptation by applying an application delay of a time unit. As described above, the PDCCH monitoring skipping is a first PDCCH monitoring adaptation. Even if the UE fails to receive a DCI indicating the PDCCH monitoring skipping, a problem does not occur in aspect of the data transmission. That is because, despite that a base station transmits a DCI, it does not happen that the UE fails to receive the DCI.

If the SSSG switching is indicated to the UE through the non-scheduling DCI, an operation of the UE may be different according to an SSSG configuration. For example, all SS sets included in SSSG #1 are configured to be included in SSSG #0, and if a switching to SSSG #1 is indicated, it can be seen as the same case as the PDCCH monitoring skipping indication.

For example, although the base station expects the UE to monitor the SSSG #1 through the SSSG stop switching indication, even if the UE actually monitors the SSSG #0, the base station may transmit the DCI through the SS sets included in the SSSG #1. And, since the UE monitors all of the corresponding SS sets, the problem that the transmitted DCI cannot be received (except for a transmission problem, etc.) does not occur. Accordingly, an application delay of a time unit may be applied in the same manner as the PDCCH monitoring skipping.

Yet, such an SSSG configuration may not be forced. Therefore, if the SSSG is not configured as described above, an SSSG misalignment problem may occur. In order to solve the SSSG misalignment problem, the base station may preferentially select an SS set included in every SSSG when transmitting DCI to the UE to which the SSSG switching is indicated. If there is no UE's response (e.g., HARQ-ACK for PUSCH or PDSCH) to the DCI for a predetermined time (e.g., settable using a fallback timer) after transmitting the DCI, the base station may retransmit the DCI with the SS set included in the SSSG before the SSSG switching indication. Meanwhile, the fallback timer may be pre-configured/indicated by the base station and designed in consideration of a minimum duration of the SSSG switching.

An application delay for a case in which the SSSG switching is indicated to the UE through the non-scheduling DCI may be configured/indicated by the base station.

According to [Embodiment #2-2], the minimum processing for decoding the DCI may be guaranteed to the UE by applying the application delay of the time unit to the non-scheduling DCI, thereby inducing the power saving effect of the UE.

3. Embodiment #2-3: UL Grant Type 2

A base station configures resource allocation for PUSCH transmission to a UE through RRC, and also activates a corresponding resource by transmitting a DCI, which is referred to as UL grant type 2. If a PUSCH is indicated by UL grant type 2 activation, the UE repeatedly transmits the PUSCH until UL grant type 2 release is indicated. The UL grant type 2 release is not accompanied by HARQ-ACK transmission of the UE.

When a PDCCH monitoring adaptation is indicated together with the UL grant type 2 activation, the UE repeatedly transmits the PUSCH, and thus, the UE performs a PDCCH monitoring adaptation for a fixed or indicated duration from a first symbol of a slot next to a slot including a symbol in which nth configured granted PUSCH transmission is completed after a timing point of receiving a DCI for indicating the PDCCH monitoring adaptation together with the UL grant type 2 activation. Although a PDCCH monitoring adaptation operation is performed based on a start symbol of a next slot of PUSCH transmission in order to facilitate a scheduling of a slot unit, it may be performed based on a symbol in which the PUSCH transmission is completed. Meanwhile, the base station may configure/indicate whether to perform the PDCCH monitoring adaptation after an $n^{th}$ PUSCH. That is, the base station may configure/indicate 'n' in determining a slot including a symbol in which $n^{th}$ PUSCH transmission is completed after a timing point of receiving the DCI.

When the PDCCH monitoring adaptation is indicated together with the UL grant type 2 release, the UE may perform the PDCCH monitoring adaptation operation as soon as stop the PUSCH transmission. Although the base station has indicated the PDCCH monitoring adaptation together with the UL grant type 2 release, if the UE continues the PUSCH transmission, the base station may retransmit the DCI including the PDCCH monitoring adaptation indication together with the UL grant type 2 release, thereby performing a subsequent procedure again.

According to [Embodiment #2-3], the PDCCH monitoring adaptation may be indicated even when Configured Grant Resource and Configured Grant PUSCH transmission are indicated to the UE, and the PDCCH monitoring adaptation may be performed by guaranteeing a proper processing time to the UE.

4. Embodiment #2-4: DL SPS

A base station configures resource allocation for PDSCH transmission to the UE through RRC. In addition, a resource allocated by transmitting a DCI may be activated, and this may be referred to as a DL SPS. If the PDSCH is indicated by the DL SPS activation, the UE repeatedly transmits the PDSCH until the DL SPS release is indicated. The DL SPS release is accompanied by HARQ-ACK transmission of the UE.

When a PDCCH monitoring adaptation is indicated together with the UL SBS activation, the UE repeatedly receives the PDSCH, and thus, the UE performs a PDCCH monitoring adaptation for a fixed or indicated duration from a first symbol of a slot next to a slot in which an HARQ-ACK for an nth PDSCH is transmitted from a timing point of receiving the DCI for the DL SPS activation and PDCCH monitoring adaptation indication. Although a PDCCH monitoring adaptation operation is performed based on a start symbol of a next slot of HARQ-ACK transmission in order to facilitate a scheduling of a slot unit, it may be performed based on a symbol in which the HARQ-ACK transmission is completed. Meanwhile, the base station may configure/indicate whether to perform the PDCCH monitoring adaptation after an HARQ-ACK for an $n^{th}$ PDSCH. That is, the base station may configure/indicate 'n' in determining a slot including a symbol in which $n^{th}$ PDSCH reception is completed after a timing point of receiving the DCI.

When the PDCCH monitoring adaptation is indicated together with the DL SPS release, the UE performs a PDCCH monitoring adaptation (the same as described above) after HARQ-ACK transmission in response to the indication. A NACK for the DL SPS release is a case where the base station fails to receive an HARQ-ACK or the UE fails to receive a DCI. Hence, the base station may retransmit the DCI including the PDCCH monitoring adaptation indication together with the DL SPS release, perform the DL SPS release, and then perform the PDCCH monitoring adaptation procedure again.

When the base station explicitly or implicitly receives a NACK message (including a NACK determination due to HARQ-ACK non-reception), a procedure similar to the indication through the scheduling DCI may be performed. The base station retransmits the DCI, and the corresponding scheduling DCI may be for retransmission for the previous scheduled PDSCH/PUSCH or may be the same PDSCH/PUSCH. If the UE receives a new scheduling DCI and a new PDCCH monitoring adaptation indication is included therein, the UE ignores the indication of the previous DCI (e.g., DL SPS activation DCI) and performs the new PDCCH monitoring adaptation indication.

If the new PDCCH monitoring adaptation indication is not included in the new scheduling DCI, the indication of the previous DCI (e.g., DL SPS activation DCI) is performed. A PDCCH monitoring adaptation through the new PDCCH monitoring adaptation indication may be based on determining, by the base station, that the previous PDCCH monitoring adaptation indication is not suitable for a timing point of performing the previous PDCCH monitoring adaptation indication through the new DCI.

Alternatively, as the base station indicates a first PDCCH monitoring adaptation, it may be a case of determining that the SS set is not sufficient for the UE to perform the HARQ retransmission procedure. Even though the UE is performing the PDCCH monitoring adaptation after HARQ-ACK transmission for an $n^{th}$ PDSCH, the UE may stop the PDCCH monitoring adaptation operation in case of transmitting a NACK. For example, as the PDCCH monitoring adaptation is performed by transmitting an HARQ-ACK for the $n^{th}$ PDSCH as an ACK, if an HARQ-ACK for an $(n+m)^{th}$ PDSCH is transmitted as a NACK, the corresponding PDCCH monitoring adaptation may be stopped after the HARQ-ACK transmission of the NACK.

In this case, the base station may or may not transmit a new PDCCH monitoring adaptation indication.

According to [Embodiment #2-4], even when the DL SPS is configured for the UE, the PDCCH monitoring adaptation is performed based on a transmission timing point of the HARQ-ACK, thereby ensuring UE's stable reception of the PDSCH. In addition, the PDCCH monitoring adaptation is performed based on a transmission timing point of the HARQ-ACK with respect to the $n^{th}$ PDSCH reception, thereby guaranteeing a DCI decoding time (i.e., a processing time) of the UE.

[Embodiment #3] Application Delay Combination

The application delays disclosed in [Embodiment #1] and [Embodiment #2] may be applied independently and also determined as combinations thereof. For example, the application delays of the time unit described above include an application delay of the Rel-16 SSSG switching and an application delay until applying a new K0min/K2min. In general, the former represents a preparation time for an SSSG switching of the UE and the latter represents a time taken to decode a DCI and apply an indication content included in the DCI. In other words, a single application delay of the time unit may not necessarily be applied, but various application delays may be considered at the same time until an actual PDCCH monitoring adaptation is indicated. Since the application delay of the PDCCH monitoring adaptation is a time required until a corresponding operation starts after DCI reception or decoding, it may be preferable that the application delay is determined as a maximum value among application delays in consideration of two or more application delays.

That is, in the above-described example, both the application delay of the SSSG switching and the application delay until applying the new K0min/K2min should be considered by the UE, and an actual PDCCH monitoring adaptation operation may not be applied before the advance preparations of the wo are completed.

Therefore, the application delay time in this case may be represented as follows.

Application Delay=Start Point of Slot that Satisfies max (slot boundary after $P_{switch}$ symbol, Slot n+X)

Yet, the application delay of the time unit described above is merely an example in consideration of two types of application delays, and may also appear as any combination between the proposed application delays.

For example, the UE may consider the application delay after UL transmission and the application delay of the SSSG switching at the same time. When a PDCCH monitoring adaptation is indicated through a scheduling DCI to the UE, a PDCCH monitoring adaptation operation may be started at the same time as an HARQ-ACK is transmitted. In this case, if an interval between a timing point of receiving a scheduling DCI and a timing point of transmitting an HARQ-ACK is shorter than an application delay indicating a time required for an actual SSSG switching, an SSSG switching may not be smoothly performed. Therefore, in this case, the application delay for the SSSG switching may also need to be considered. Accordingly, the UE may perform the actual PDCCH monitoring adaptation operation by using an application delay corresponding to the maximum value of the two application delays in consideration of the two application delays.

As described above, whenever each application delay is to be considered, a maximum value of a plurality of application delays may be utilized as an application delay until an actual PDCCH monitoring adaptation is performed. In this case, regarding the utilized (i.e., applied) application delay, according to each situation, the UE may consider an application delay of an SSG switching if the SSG switching is indicated, an application delay for K0min/K2min if a cross-slot scheduling is configured, or an application delay corresponding to a timing after UL transmission if a PDCCH monitoring adaptation is indicated through a scheduling DCI. In addition, this is an example, and when an application delay exactly suitable for a situation is considered or even when application delays configured for respective situations are applied independently or in combination thereof, the proposed methods of [Embodiment #3] may be considered.

According to [Embodiment #3], even in a situation in which two or more application delays should be considered, a maximum value among the application delays may be applied, thereby satisfying all purposes of intending to apply an application delay.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 14:
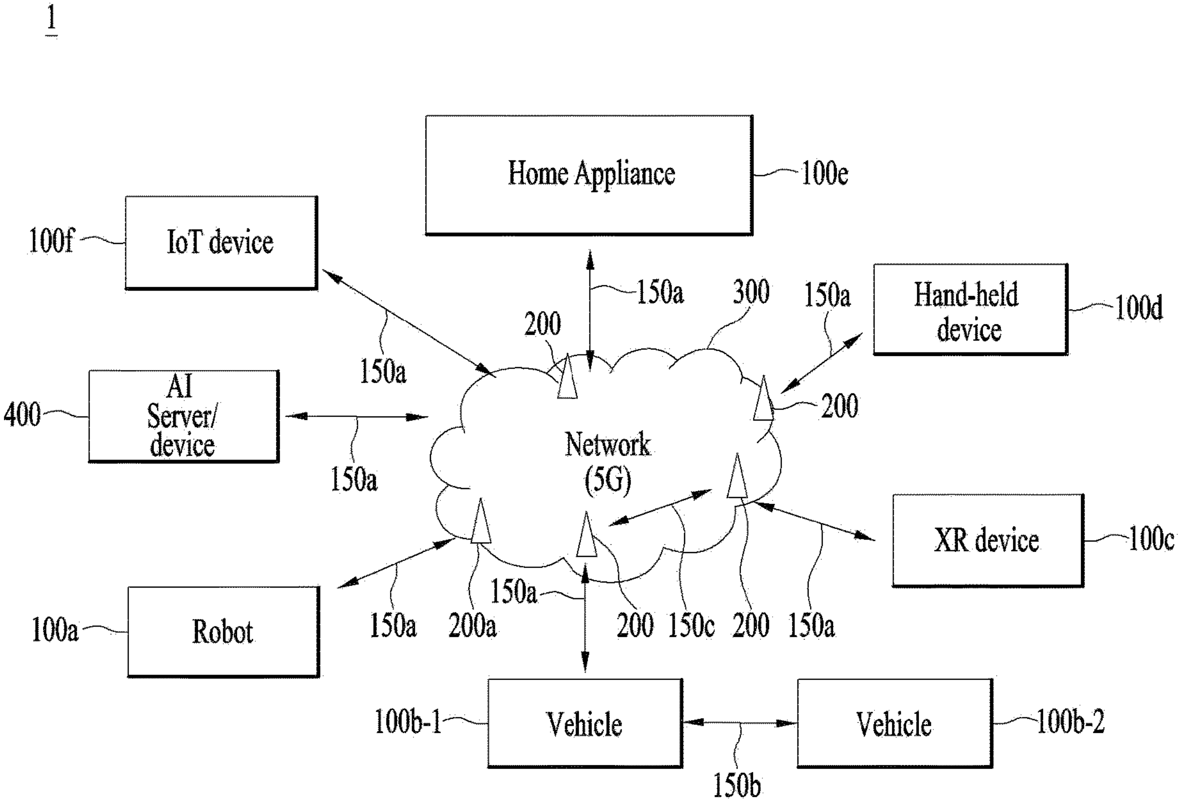
FIG. 14 illustrates an exemplary communication system applied to the present disclosure.

FIG. 14 illustrates a communication system 1 applied to the present disclosure.

Referring to FIG. 14, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g., V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g., relay or integrated access backhaul(IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 15:
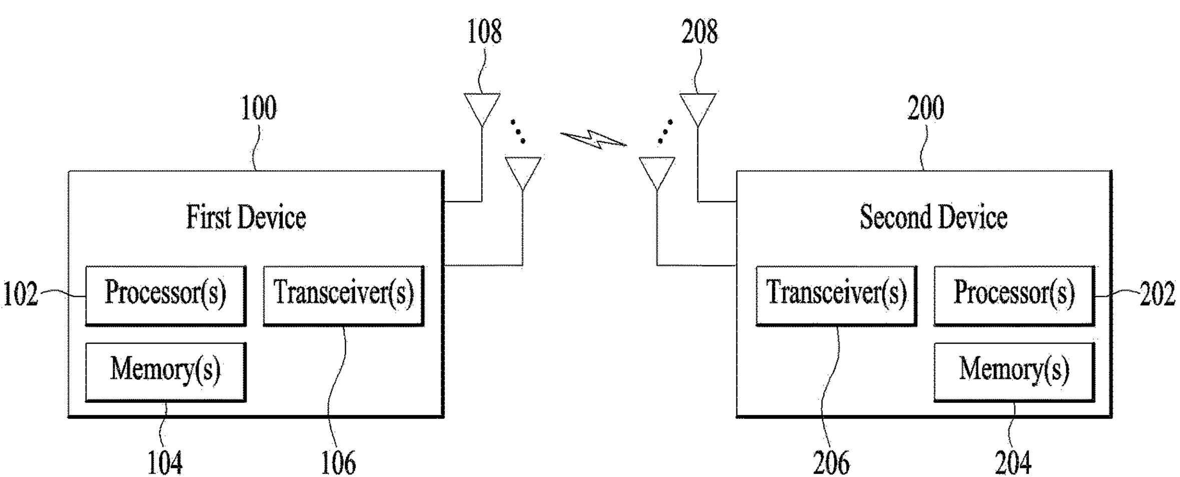
FIG. 15 illustrates an exemplary wireless device applicable to the present disclosure.

FIG. 15 illustrates wireless devices applicable to the present disclosure.

Referring to FIG. 15, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor(s) 102 of the first wireless device 100 and stored in the memory(s) 104 of the first wireless device 100, according to an embodiment of the present disclosure will now be described.

Although the following operations will be described based on a control operation of the processor(s) 102 in terms of the processor(s) 102, software code for performing such an operation may be stored in the memory 104. For example, in the present disclosure, the at least one memory(s) 104 may store instructions or programs as a computer-readable storage medium. The instructions or the programs may cause, when executed, at least one processor operably connected to the at least one memory to perform operations according to embodiments or implementations of the present disclosure, related to the following operations.

For example, the processor 102 may transmit capability information and/or UE assistance information to the base station through the transceiver 106 in order to support the operation proposed in the disclosure. For example, information for determining an application delay may be included in the capability information and/or the UE assistance information. Transmitting the capability information and/or the UE assistance information via the transceiver 106 may be skipped in a particular situation (e.g., a case that the base station already has prior or advance information or a case that each operating scheme is changed due to the need for the base station).

The processor 102 may receive, through the transceiver 106, information for configuring a PDCCH monitoring adaptation transmitted by the base station in order to support an operation proposed in the present disclosure. For example, the corresponding information may be received using a higher layer signal (e.g., System Information Block (SIB) or RRC signaling). Further, the processor 102 may receive, via the transceiver 106, a Downlink Control Information (DCI) including an indicator of the PDCCH monitoring adaptation based on the information received through a higher layer. In other words, one of the configurations related to a plurality of PDCCH monitoring adaptation operations provided to the processor 102 in a semi-static manner may be received through a specifically indicated scheme (e.g., DCI or MAC CE/header).

Based on the received DCI and the application delay according to an embodiment of the present disclosure, the processor 102 may expect a timing point capable of receiving a PDCCH, PDSCH, and/or PUSCH, determine a timing point of performing a PDCCH monitoring adaptation operation, and receive the PDCCH through the transceiver 106 according to the corresponding PDCCH monitoring adaptation operation.

A specific operation process of the processor 102 described above may be based on at least one of [Embodiment #1] to [Embodiment #3].

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 200 and stored in the memory 204 of the second wireless device 200, according to an embodiment of the present disclosure will now be described.

Although the following operations will be described based on a control operation of the processor 202 in terms of the processor 202, software code for performing such an operation may be stored in the memory 204. For example, in the present disclosure, the at least one memory 204 may store instructions or programs as a computer-readable storage medium. The instructions or the programs may cause, when executed, at least one processor operably connected to the at least one memory to perform operations according to embodiments or implementations of the present disclosure, related to the following operations.

For example, the processor 202 may receive capability information and/or UE assistance information from the UE through the transceiver 206 to support the operation proposed in the disclosure. For example, information for determining an application delay may be included in the capability information and/or the UE assistance information. Receiving the capability information and/or the UE assistance information via the transceiver 206 may be skipped in a particular situation (e.g., a case that the processor 202 already has prior or advance information or a case that each operating scheme is changed due to the need for the processor 202).

To support the operation proposed by the disclosure, the processor 202 may transmit, to the UE, information for configuring a PDCCH monitoring adaptation through the transceiver 206. For example, the corresponding information may be received using a higher layer signal (e.g., System Information Block (SIB) or RRC signaling). In addition, the processor 202 may transmit, on the basis of the information transmitted through a higher layer, Downlink Control Information (DCI) including an indicator of the PDCCH monitoring adaptation through the transceiver 206. In other words, one of the configurations related to a plurality of PDCCH monitoring adaptation operations provided to the UE in a semi-static manner may be transmitted through a specifically indicated scheme (e.g., DCI or MAC CE/header).

The processor 202 may expect a timing point capable of transmitting a PDCCH, a PDSCH, and/or a PUSCH based on a DCI and an application delay according to an embodiment of the present disclosure, determine a timing point of performing a PDCCH monitoring adaptation operation, and transmit the PDCCH through the transceiver 206 according to the corresponding PDCCH monitoring adaptation operation.

A specific operation process of the processor 202 described above may be based on at least one of [Embodiment #1] to [Embodiment #3].

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 16:
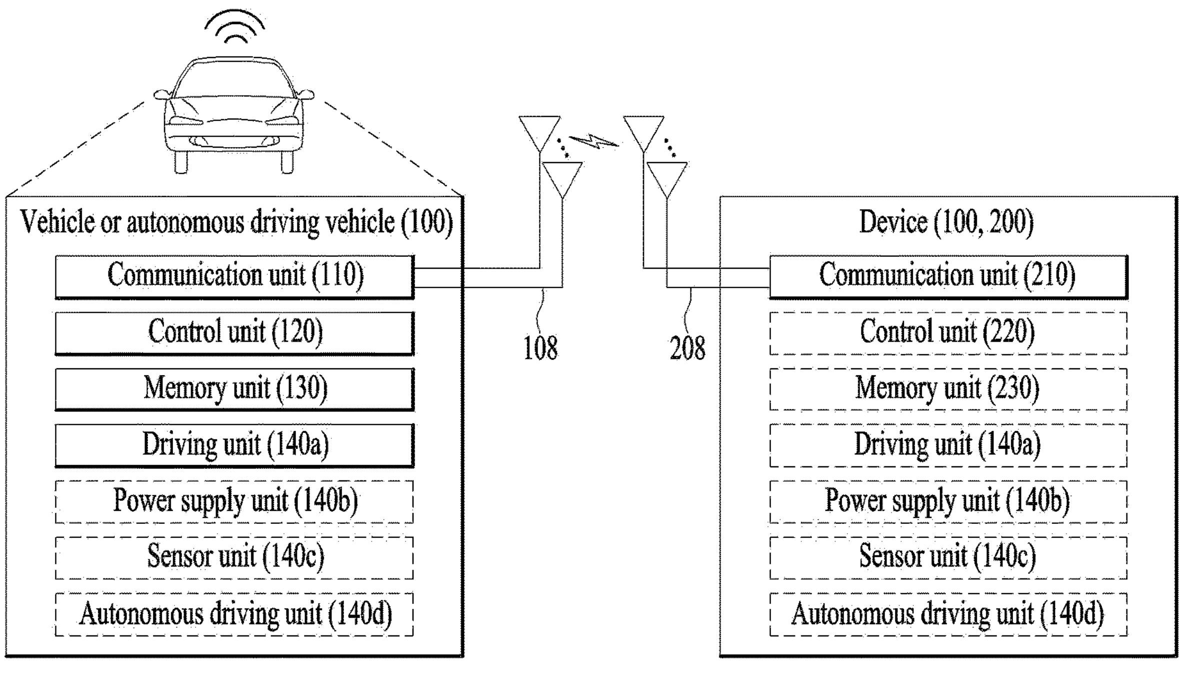
FIG. 16 illustrates an exemplary vehicle or autonomous driving vehicle applicable to the present disclosure.

FIG. 16 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 16 a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 17:
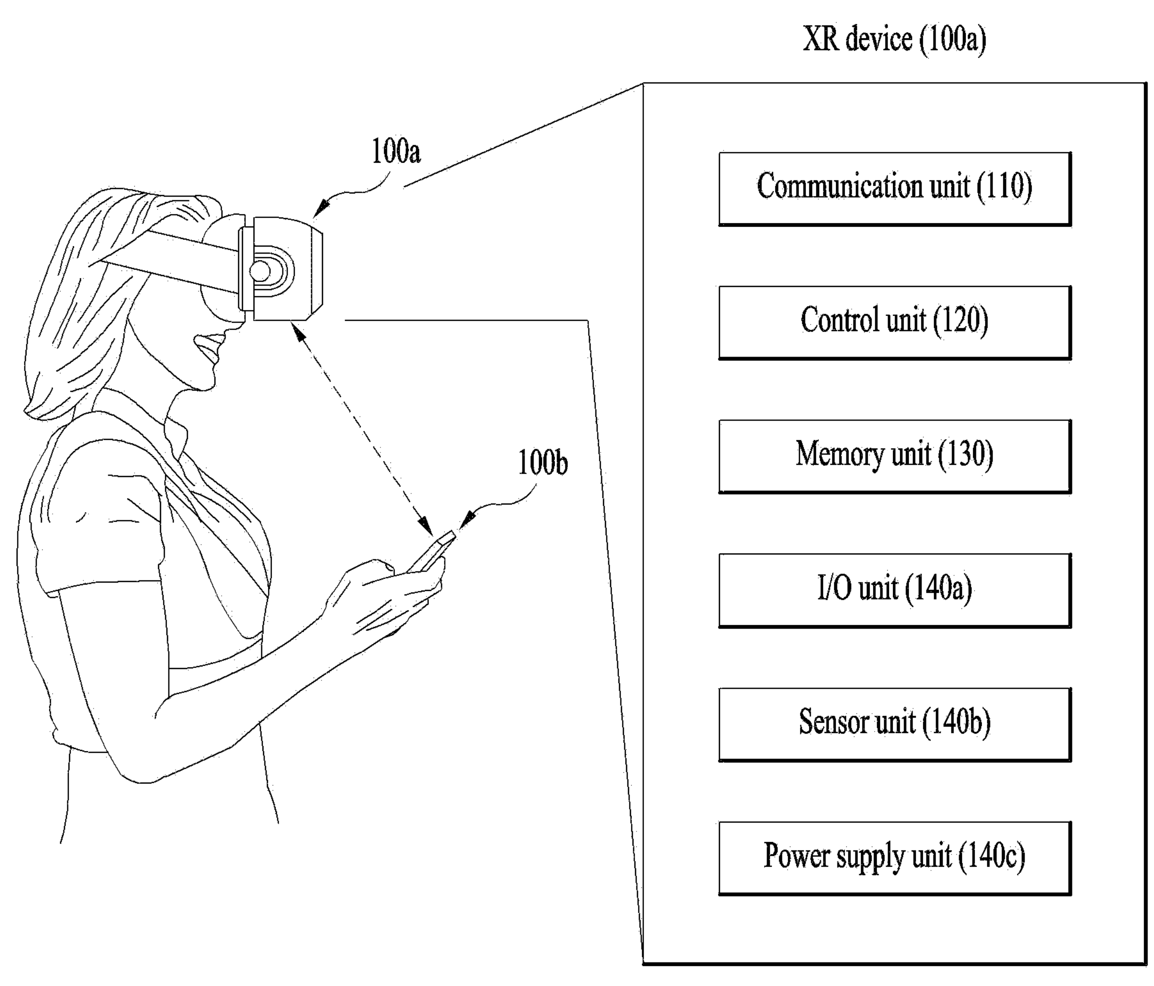
FIG. 17 illustrates an extended reality (XR) device applicable to the present disclosure.

FIG. 17 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 17, an XR device 100*a* may include a communication unit 110, a control unit 120, a memory unit 130, an I/O unit 140*a*, a sensor unit 140*b*, and a power supply unit 140*c*.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method of transmitting and receiving a signal in an unlicensed band and an apparatus therefor have been described based on an example applied to a 5G NR system, the method and apparatus are applicable to various wireless communication systems in addition to the 5G NR system.

What is claimed is:

1. A method comprising:

receiving a first parameter related to a Physical Downlink Control Channel (PDCCH) monitoring adaptation;

receiving a second parameter related to at least one threshold related with an offset indicating an interval between a Downlink (DL) transmission and an Uplink (UL) transmission related to the DL transmission;

receiving a Downlink Control Information (DCI) including (i) a first information related to a PDCCH monitoring adaptation based on the first parameter and (ii) a second information for indicating the offset; and receiving the PDCCH from a specific time based on the first information, wherein the specific time is determined based on comparing the offset and the at least one threshold, and wherein based on the offset exceeding the at least one threshold, the specific time is a time related to the at least one threshold.

2. The method of claim 1, wherein the at least one threshold comprises a maximum threshold and a minimum threshold related with the offset.

3. The method of claim 1, wherein the DCI is for scheduling a Physical Downlink Shared Channel (PDSCH) and wherein the offset indicates an interval between the PDSCH and a Hybrid Automatic Repeat Request-Acknowledgment (HARQ-ACK) related to the PDSCH.

4. The method of claim 1, wherein the DCI is for scheduling a Physical Uplink Shared Channel (PUSCH) and wherein the offset indicates an interval between the DCI and the PUSCH.

5. The method of claim 1, wherein based on the offset smaller than the at least one threshold, the specific time is a time related to the at least one threshold.

6. A user equipment receiving a Physical Downlink Control Channel (PDCCH) in a wireless communication system, the user equipment comprising:

at least one transceiver; at least one processor; and at least one memory connected operably to the at least one processor and configured to store instructions for enabling the at least one processor to perform an operation when executed, wherein the operation comprises receiving a first parameter related to a Physical Downlink Control Channel (PDCCH) monitoring adaptation through the at least one transceiver, receiving a second parameter related to at least one threshold related with an offset indicating an interval between a Downlink (DL) transmission and an Uplink (UL) transmission related to the DL transmission through the at least one transceiver, receiving a Downlink Control Information (DCI) including (i) a first information related to a PDCCH monitoring adaptation based on the first parameter and (ii) a second information for indicating the offset through the at least one transceiver, and receiving the PDCCH from a specific time based on the first information through the at least one transceiver and wherein the specific time is determined based on comparing the offset and the at least one threshold, and wherein based on the offset exceeding the at least one threshold, the specific time is a time related to the at least one threshold.

7. The user equipment of claim 6, wherein the at least one threshold comprises a maximum threshold and a minimum threshold related with the offset.

8. The user equipment of claim 6, wherein the DCI is for scheduling a Physical Downlink Shared Channel (PDSCH) and wherein the offset indicates an interval between the PDSCH and a Hybrid Automatic Repeat Request-Acknowledgment (HARQ-ACK) related to the PDSCH.

9. The user equipment of claim 6, wherein the DCI is for scheduling a Physical Uplink Shared Channel (PUSCH) and wherein the offset indicates an interval between the DCI and the PUSCH.

10. The user equipment of claim 6, wherein based on the offset smaller than the at least one threshold, the specific time is a time related to the at least one threshold.

11. A base station transmitting a Physical Downlink Control Channel (PDCCH) in a wireless communication system, the base station comprising:

at least one transceiver; at least one processor; and at least one memory connected operably to the at least one processor and configured to store instructions for enabling the at least one processor to perform an operation when executed, wherein the operation comprises transmitting a first parameter related to a Physical Downlink Control Channel (PDCCH) monitoring adaptation through the at least one transceiver, transmitting a second parameter related to at least one threshold related with an offset indicating an interval between a Downlink (DL) transmission and an Uplink (UL) transmission related to the DL transmission through the at least one transceiver, transmitting a Downlink Control Information (DCI) including (i) a first information related to a PDCCH monitoring adaptation based on the first parameter and (ii) a second information for indicating the offset through the at least one transceiver, and transmitting the PDCCH from a specific time based on the first information through the at least one transceiver and wherein the specific time is determined based on comparing the offset and the at least one threshold, and wherein based on the offset exceeding the at least one threshold, the specific time is a time related to the at least one threshold.

* * * * *